United States Patent
Bruls

(10) Patent No.: US 9,344,702 B2
(45) Date of Patent: May 17, 2016

(54) ENCODER, DECODER, BIT-STREAM, METHOD OF ENCODING, METHOD OF DECODING AN IMAGE PAIR CORRESPONDING WITH TWO VIEWS OF A MULTI-VIEW SIGNAL

(75) Inventor: Wilhelmus Hendrikus Alfonsus Bruls, Eindhoven (NL)

(73) Assignee: Koninklijke Philips N.V., Eindhoven (NL)

(*) Notice: Subject to any disclaimer, the term of this patent is extended or adjusted under 35 U.S.C. 154(b) by 613 days.

(21) Appl. No.: 13/814,348

(22) PCT Filed: Aug. 4, 2011

(86) PCT No.: PCT/IB2011/053474
§ 371 (c)(1),
(2), (4) Date: Feb. 5, 2013

(87) PCT Pub. No.: WO2012/020358
PCT Pub. Date: Feb. 16, 2012

(65) Prior Publication Data
US 2013/0135437 A1 May 30, 2013

(30) Foreign Application Priority Data

Aug. 9, 2010 (EP) .................................... 10172297
May 27, 2011 (EP) .................................... 11167808

(51) Int. Cl.
*H04N 13/00* (2006.01)
*H04N 7/26* (2006.01)
(Continued)

(52) U.S. Cl.
CPC ......... *H04N 13/0022* (2013.01); *H04N 13/004* (2013.01); *H04N 13/0048* (2013.01); *H04N 19/33* (2014.11); *H04N 19/597* (2014.11); *H04N 13/0059* (2013.01)

(58) Field of Classification Search
CPC .......... H04N 13/0022; H04N 13/0048; H04N 13/004; H04N 13/33; H04N 13/597; H04N 13/0059
USPC .................................................... 375/240.01
See application file for complete search history.

(56) References Cited

U.S. PATENT DOCUMENTS

2009/0015662 A1   1/2009   Kim et al.
2010/0135379 A1   6/2010   Fortin et al.
(Continued)

FOREIGN PATENT DOCUMENTS

WO   2008075247 A1   6/2008
WO   2009040701 A2   4/2009
(Continued)

OTHER PUBLICATIONS

High-Definition Multimedia Interface Specification Version 1.4a Extraction of 3D Signaling Portion. Mar. 4, 2010. 2001-2010 Hitachi Ltd., Panasonic Corporation, Philips Consumer Electronics International B.V., Silicon Image, Inc., Sony Corporation, Technicolor, S.A. and Toshiba Corporation.

(Continued)

*Primary Examiner* — Hee-Yong Kim

(57) ABSTRACT

A method of encoding an image pair (L,R) corresponding with two views of a multi-view signal, the method comprising generating a first combined image (LeRo) based on a first low pass filtered version of a first image of the image pair and a first low-pass filtered version of the second image of the image pair, generating a base-layer (LR-bas) by encoding the first combined image (LeRo), generating first and second disparity based predictors (LpredD,RpredD) and respectively associated first and second block-based displacement vectors (LHvec,RHvec) associated with the image information encoded in the base layer (LeRo'), the first and second block-based displacement vectors (LHvec,RHvec) being generated using disparity information present in the first and second images (L,R), the image information encoded in the base-layer (LeRo') and the respective first and second images (L,R), generating an enhancement-layer (LR-enh; L-enh,R-enh) by encoding the first and second images (L,R) using the first and second disparity based predictors (LpredD, RpredD).

21 Claims, 10 Drawing Sheets

(51) Int. Cl.
*H04N 7/12* (2006.01)
*H04N 19/597* (2014.01)
*H04N 19/33* (2014.01)

(56) References Cited

U.S. PATENT DOCUMENTS

2010/0195900 A1    8/2010   Kim et al.
2010/0260268 A1   10/2010   Cowan et al.
2010/0271465 A1*  10/2010   Lee .................. H04N 13/0048
                                                              348/51

FOREIGN PATENT DOCUMENTS

WO    2010010521 A2   1/2010
WO    2011005624 A1   1/2011

OTHER PUBLICATIONS

Arican, Zafer et al. Intermediate View Generation for Perceived Depth Adjustment of Steno Video. Sep. 2009. TR2009-052. Mitsubishi Electric Research Laboratories. Cambridge, MA.

Husak, Walt. Dolby 3D White Paper. Dolby Laboratories, Inc., Burbank, CA. 2010.

* cited by examiner

| | Description | Standard? | Complexity | Cod.eff. | b+e Pic Q | b Pic Q | b + pp Pic Q | Remarks |
|---|---|---|---|---|---|---|---|---|
| | | | | | Full res = 100% | | | |
| Reference | Frame compat bas LReo enh LRoe mvc+pre/post proc+MB tools | N | 2HD avc + MB rpu | 150% | 90% | 40% | – | |
| First Variant, FIG. 6A,B | Frame compat bas LRee enh LRoo mvc+pre/post proc | y | 2HD avc | 160% | 90% | 40% | – | |
| Second Variant, FIG. 7A,B | Frame compat bas LRee enh LRoo mvc+pre/post proc+vidpost proc | n | 2HD avc + postproc | 155% | 90% | 40% | 70% | |
| First Aspect, FIG. 2A,B | Frame compat bas LReo enh LRoe mvc+pre/post proc+MB disp. | N | 2HD avc + MB dis | 150% | 90% | 40% | – | Disp vectors var BL 3DOSD |
| Second Aspect, FIG. 5 | Frame compat bas LReo enh L, R | N | 3HD avc + MB dis | 160% | 100% | 40% | | Disp vectors var BL 3DOSD |
| Third Variant, FIG. 8 | Frame compat bas LReo enh1 LRoe nf enh2 LReo nf | N | 3HD avc + MB dis | 170% | 100% | 50% | | |

Overview of various options with their most important properties

Y complete standard is available

N complete standard is not available, can be developed with significant effort, signalling, external MB video prediction tools y complete standard is not available, can be developed with very little effort for signalling n complete standard is not available, can be developed with little effort for signalling + SEI postproc

FIG. 9

ENCODER, DECODER, BIT-STREAM, METHOD OF ENCODING, METHOD OF DECODING AN IMAGE PAIR CORRESPONDING WITH TWO VIEWS OF A MULTI-VIEW SIGNAL

FIELD OF THE INVENTION

The present invention relates to an encoder, a decoder, a bit-stream, a method of encoding, and a method of decoding an image pair corresponding with two views of a multi-view signal, a computer program product on a computer readable medium and a software tool for executing said methods.

BACKGROUND OF THE INVENTION

Stereoscopic displays are becoming increasingly more popular. Stereoscopic display devices include e.g. LCD and plasma displays utilizing shutter glasses, LCD devices which can be used in conjunction with polarizing glasses as well as various other types of stereoscopic display devices.

Stereoscopic content may already be provided for such display devices by means of e.g. pre-recorded material in the form of 3D-BD discs, capable of delivering full resolution 1920×1080 images for both the left and right eye. In the meantime, standardization of 3D broadcast is being discussed in various fora.

In order to deliver stereo content so-called frame compatible formats, where the left and right view are combined into one normal HD (1920×1080) frame, are considered to be very attractive. These formats allow re-use of the existing HD infra-structure including e.g. existing DVB broadcast channels, re-use of existing STB hardware, etc. in order to enable stereo content delivery.

In order to enable distribution of content most 3D TV receivers support several frame compatible formats such as via the HDMI input interface, see e.g. http://www.hdmi.org/manufacturer/specification.aspx for the publicly downloadable 3D portion of the HDMI V1.4a specification.

However one important drawback of the frame compatible distribution formats is their reduced spatial resolution. It has been suggested that the limitations of the frame compatible distribution formats can be overcome by enabling the addition, e.g. at a later stage, of an enhancement layer.

SUMMARY OF THE INVENTION

However, the inventors have recognized that the combination of a frame compatible distribution format and an enhancement layer may have some issues:
A) The enhancement layer may not be able to provide full HD for each eye.
B) Encoding and/or decoding the enhancement layer may add complexity compared to e.g. MultiView Video Coding. Moreover, additional signaling may be needed in the bit-stream.
C) Conventional frame compatible formats are very much targeted at (and limited to) 2-view (stereo) displays, and for example, do not provide support for autostereoscopic displays.
D) The coding of the enhancement layer may be insufficiently efficient, e.g., as a result of an inefficient prediction, resulting in a total extra bit rate for the enhancement layer.
E) Frame compatible distribution formats only enable the transmission of fixed left and right viewpoints which have hard-coded disparity. As a result the stereo content has to be tuned to a particular screen size, and as a consequence, the comfort level as experienced by viewers watching such content not only differs per person, but also per display used.
F) 3D TV receivers are already entering the market place. As a result it is becoming ever more likely that a new stereoscopic distribution standard will have to embrace the currently available frame compatible formats. Said 3D TV receivers may obtain a sub-optimal image quality when the frame compatible distribution format is not specifically adapted to said currently available frame compatible formats.
G) The base layer may be compromised in order to approach full resolution with both layers, e.g., the base-layer may comprise a sub-sampled version of the left/right views, which may only have been band limited with a weak low-pass filter prior to sub-sampling. This may cause aliasing effects which can be annoying in particular when there is motion in the video signal.

Thus the list of requirements is long; there is a need for full resolution HD for both eyes, there is a need for support for variable baseline processing and there is a need to provide support for AVC (H264) and MPEG2 coding standards as both are used for 3D frame compatible formats in the market.

It is an object of the present invention to address at least one of the abovementioned issues.

In accordance with an aspect of the present invention, a method is provided of encoding an image pair corresponding with two views of a multi-view signal, the method comprising generating a first combined image based on a first low pass filtered version of a first image of the image pair and a first low-pass filtered version of the second image of the image pair, the first combined image comprising samples having a first parity from the first low-pass filtered version of the first image, the samples being spatially co-located in the first combined image and samples having a second parity from the first low-pass filtered version of the second image, the samples being spatially co-located in the first combined image, generating a base-layer by encoding the first combined image, generating first and second disparity based predictors and respectively associated first and second block-based displacement vectors associated with the image information encoded in the base layer, the first and second block-based displacement vectors being generated using disparity information present in the first and second images, the image information encoded in the base-layer and the respective first and second images, and generating an enhancement-layer by encoding the first and second images using the first and second disparity based predictors.

In accordance with the abovementioned aspect of the present invention, an encoder, a decoder, a method of decoding an image pair corresponding with two views of a multi-view signal as well as a bit-stream representing two views of a multi-view signal, according to the present invention are provided as follows.

A first embodiment of a bit-stream (BS) comprising an encoded image pair (L,R) corresponding with two views of a multi-view signal, the bit-stream comprising:
   a base-layer (LR-bas), the base-layer comprising an encoded first combined image (LeRo') being encoded using a first encoder,
   an enhancement-layer (LR-enh), the enhancement-layer comprising encoded first and second images (L,R) being encoded using an enhancement encoder and using a predictor input based on the decoded encoded first combined image (LeRo'), wherein the encoded first combined image (LeRo') is based on a first combined image (LeRo), the first combined image (LeRo) is based on a first low pass filtered version of a first image of an original image pair and a first low-pass filtered version of a second image of the original image pair, the first combined image (LeRo) comprising:

samples having a first parity from the first low-pass filtered version of the first image, the samples being spatially co-located in the encoded first combined image and samples having a second parity from the first low-pass filtered version of the second image, the samples being spatially co-located in the encoded first combined image, first and second block-based displacement vectors (LHvec, RHvec) associated with the image information encoded in the base layer (LeRo'), the first and second block-based displacement vectors (LHvec,RHvec) being generated using disparity information present in the first and second images (L,R), the image information encoded in the base-layer (LeRo') and the respective first and second images (L,R).

A first embodiment of a method of decoding an image pair (L,R) corresponding with two views of a multi-view signal, the method comprising:

generating a first decoded combined image (LeRo ') by decoding a base-layer (LR-bas), generating first and second disparity based predictors (LpredD,RpredD) using respectively associated first and second block-based displacement vectors (LHvec, RHvec) in combination with the first decoded combined image (LeRo'), the first and second block-based displacement vectors (LHvec,RHvec) being associated with the first decoded combined image (LeRo'), the first and second block-based displacement vectors (LHvec, RHvec) being generated using disparity information present in the first and second images (L,R), the first decoded combined image (LeRo ') and the respective first and second images (L,R), decoding an enhancement-layer (LR-enh; L-enh,R-enh) using the first and second disparity based predictors (LpredD,RpredD) forming a first reconstructed image (L') and a second reconstructed image (R').

An first embodiment of an encoder for encoding an image pair (L, R) corresponding with two views of a multi-view signal, the encoder comprising:

a first generator for generating a first combined image (LeRo) based on a first low pass filtered version of a first image of the image pair and a first low-pass filtered version of the second image of the image pair, the first combined image (LeRo) comprising:

samples having a first parity from the first low-pass filtered version of the first image, the samples being spatially co-located in the first combined image and samples having a second parity from the first low-pass filtered version of the second image, the samples being spatially co-located in the first combined image, a first encoder (Enc1) for generating a base-layer (LR-bas) by encoding the first combined image (LeRo ), a second generator for generating first and second disparity based predictors (LpredD,RpredD) and respectively associated first and second block-based displacement vectors (LHvec,RHvec) associated with the image information encoded in the base layer (LeRo'), the first and second block-based displacement vectors (LHvec,RH-vec) being generated using disparity information present in the first and second images (L,R), the image information encoded in the base-layer (LeRo') and the respective first and second images (L,R), an enhancement encoder (Enc2; Enc2,Enc3) for generating an enhancement layer (LR-enh; L-enh,R-enh) by encoding the first and second images (L,R) using the first and second disparity based predictors (LpredD, RpredD).

A first embodiment of a decoder for decoding an image pair (L,R) corresponding with two views of a multi-view signal, the decoder comprising:

a first decoder for generating a first decoded combined image (LeRo') by decoding a base-layer, a first generator for generating first and second disparity based predictors (LpredD,RpredD) using respectively associated first and second block-based displacement vectors (LHvec,RHvec) in combination with the first decoded combined image (LeRo'), the first and second block-based displacement vectors (LHvec,RHvec) being associated with the first decoded combined image (LeRo'), the first and second block-based displacement vectors (LHvec,RHvec) being generated using disparity information present in the first and second images (L,R), the first decoded combined image (LeRo') and the respective first and second images (L,R), an enhancement decoder for decoding an enhancement-layer (LR- enh; Lenh, R-enh) using the first and second disparity based predictors (LpredD,RpredD) forming a first reconstructed image (L ') and a second reconstructed image (R').

The abovementioned measures provide an encoding/decoding solution in which an image pair is encoded in a base-layer in the form of a first combined image. As such, the image pair is provided at a base quality level. Additionally, an enhancement layer is provided in which the image pair is encoded using first and second disparity based predictors. The enhancement layer allows a decoder to obtain the image pair at an enhanced resolution level.

The first and second disparity based predictors provide an improvement of the encoding efficiency of the enhancement layer. A reason for this is that the disparity allows a first image that is decoded from the base layer to be estimated from a decoded second image, and vice versa. Thus, the predictor may use a combination of the decoded first image and a version of the first image that is estimated from a decoded second image to obtain an improved prediction of the first image. As a consequence, less bandwidth is needed for encoding the enhancement layer, or given a same bandwidth, a better quality is obtained.

Moreover, the first and second block-based displacement vectors are provided as part of the bit-stream, thereby enabling a decoder decoding the bitstream to regenerate the first and second disparity based predictors and thus to obtain the image pair at an enhanced quality level. The scheme addresses issue D by providing an efficient predictor. Moreover, the scheme addresses issues C and E by providing the first and second block-based displacement vectors, which can be used in a decoder to efficiently obtain the disparity between the image pair, enabling the decoder to, e.g., render additional images for autostereoscopic displays, or render a further image pair having a different, e.g., reduced, level of disparity. Consequently, it will be easier to perform variable base-line processing on account of the fact that disparity information is included in the stream for use at the decoder side.

It is noted that the first parity from the first low-pass filtered version of the first image may be different from the second parity from the first low-pass filtered version of the second image. For example, the first parity from the first low-pass filtered version of the first image may be an 'even' parity, and the second parity from the first low-pass filtered version of the second image may be an 'odd' parity. Alternatively, the first parity from the first low-pass filtered version of the first image may be equal to the second parity from the first low-pass filtered version of the second image. For example, both parities may be 'even' parities.

Optionally, generating the first and second disparity based predictors comprises generating the first disparity predictor and the first block-based displacement vectors based on the image information encoded in the base-layer, the first image and disparity information derived from the first and second images, and the second disparity predictor and the second block-based displacement vectors based on the image information encoded in the base-layer, the second image and disparity information derived from the first and second images. Said measures are particularly well suited for generating the first and second disparity based predictors.

Optionally, the first and second images are encoded in the enhancement layer in the form of a second combined image, and the method further comprises generating the second combined image based on a second low pass filtered version of the first image of the image pair and a second low-pass filtered version of the second image of the image pair, the second combined image comprising samples having second parity from the second low-pass filtered version of the first image the samples being spatially co-located in the second combined image and samples having first parity from the second low-pass filtered version of the second image the samples being spatially co-located in the second combined image.

It is noted that the second parity from the second low-pass filtered version of the first image is different from the first parity from the first low-pass filtered version of the first image, and that the first parity from the second low-pass filtered version of the second image is different from the second parity from the first low-pass filtered version of the first image.

The second parity from the second low-pass filtered version of the first image may be different from the first parity from the second low-pass filtered version of the second image. For example, the second parity from the second low-pass filtered version of the first image may be an 'even' parity, and the first parity from the second low-pass filtered version of the second image may be an 'odd' parity. Alternatively, the second parity from the second low-pass filtered version of the first image may be equal to the first parity from the second low-pass filtered version of the second image. For example, both parities may be 'even' parities.

In accordance with the abovementioned aspect of the present invention, an encoder, a decoder, a method of decoding an image pair corresponding with two views of a multi-view signal as well as a bit-stream representing two views of a multi-view signal, according to the present invention are provided as follows.

A second embodiment of the first embodiment of the bit-stream described above wherein the first and second images (L,R) are encoded in the enhancement-layer (LR-enh) in the form of a second combined image (LoRe), the second combined image (Lo Re) being based on a second low pass filtered version of the first image of the image pair and a second low-pass filtered version of the second image of the image pair, the second combined image (LoRe) comprising:
 samples having second parity from the second low-pass filtered version of the first image the samples being spatially co-located in the second combined image, and
 samples having first parity from the second low-pass filtered version of the second image the samples being spatially co-located in the second combined image.

The method described above, wherein the first and second images (L,R) are encoded in the enhancement layer (LR-enh) in the form of a second combined image (LoRe), and the method further comprises:
 generating the second decoded combined image (LoRe') by decoding the enhancement-layer (LR-enh) using the first and second disparity based predictors (LpredD, RpredD),
 reconstructing the first reconstructed image (L')
  using spatially co-located samples in the first decoded combined image (LeRo') as samples having a first parity in the first reconstructed image (L') and
  using spatially co-located samples in the second decoded combined image (LoRe') as samples having a second parity in the first reconstructed image (L'),
  thereby forming the first reconstructed image (L'), and reconstructing the second reconstructed image (R')
  using further spatially co-located samples in the first decoded combined image (LeRo') as samples having a second parity in the second reconstructed image (R') and
  using further spatially co-located samples in the second decoded combined image (Lo Re') as samples having a first parity in the second reconstructed image (R'), thereby forming the second reconstructed image.

A second embodiment of the first embodiment of the encoder described above, wherein the first and second images (L,R) are encoded in the enhancement layer (LR-enh) in the form of a second combined image (LoRe), and wherein the encoder further comprises:
 a third generator for generating the second combined image (Lo Re) based on a second low pass filtered version of the first image of the image pair and a second low-pass filtered version of the second image of the image pair, the second combined image (LoRe) comprising:
 samples having second parity from the second low-pass filtered version of the first image the samples being spatially co-located in the second combined image and
 samples having first parity from the second low-pass filtered version of the second image the samples being spatially co-located in the second combined image.

A second embodiment of the first embodiment of the decoder described above, wherein the first and second images (L,R) are encoded in the enhancement layer (LR-enh) in the form of a second combined image (LoRe), and the decoder further comprises:
 the enhancement decoder comprising a second decoder for generating the second decoded combined image (LoRe') by decoding the enhancement-layer (LR-enh) using the first and second disparity based predictors (LpredD, RpredD),
 a first reconstructor for reconstructing the first reconstructed image (L')
  using spatially co-located samples in the first decoded combined image (LeRo ') as samples having a first parity in the first reconstructed image (L ') and
  using spatially co-located samples in the second decoded combined image (LoRe') as samples having a second parity in the first reconstructed image (L'),
  thereby forming the first reconstructed image (L '), and
 a second reconstructor for reconstructing the second reconstructed image (R')

using further spatially co-located samples in the first decoded combined image (LeRo') as samples having a second parity in the second reconstructed image (R') and using further spatially co-located samples in the second decoded combined image (LoRe') as samples having a first parity in the second reconstructed image (R'), thereby forming the second reconstructed image.

The above measures provide an enhancement layer in which the image pair is encoded in the form of a second combined image, comprising samples of the first and second images that are complementary to those provided by the first combined image in the base layer. This is a particularly efficient way of providing an enhancement layer enabling enhanced resolution, as the samples of the image pair that are omitted from the base-layer, for reasons of sub-sampling, are now provided by the enhancement layer. The scheme provides an approximation of full HD per eye in line with the known prior art.

Optionally, generating the block-based displacement vectors comprises generating an initial disparity estimation using the first and second images and generating block-based displacement vectors associated with the respective the disparity predictors using the initial disparity estimation. Said measures provide a three-stage approach which is particularly well-suited for generating the block-based displacement vectors.

Optionally, the method set forth may further comprise combining the first disparity predictor and the second disparity based predictor into a disparity based predictor, the disparity based predictor comprising samples having second parity from the first disparity predictor of the first image, the samples being spatially co-located in the disparity based predictor, and samples having first parity from the second disparity predictor of the second image, the samples being spatially co-located in the disparity based predictor, and wherein said encoding the first and second images comprises using the first and second disparity based predictors in the form of the disparity based predictor. The format of the disparity based predicator is thus adapted to the format of the second combined image.

Optionally, the enhancement-layer is formed by a first enhancement-layer and a second enhancement-layer, and the method further comprises generating the first enhancement-layer by encoding the first image using the first disparity based predictor, and generating the second enhancement layer by encoding the second image using the second disparity based predictor.

In accordance with the abovementioned aspect of the present invention, an encoder, a decoder, a method of decoding an image pair corresponding with two views of a multi-view signal as well as a bit-stream representing two views of a multi-view signal, a computer program product and a software tool for executing the methods according to the present invention are provided as follows.

Another embodiment of the first embodiment of the bit-stream described above, wherein the enhancement-layer is formed by a first enhancement-layer (L-enh) and a second enhancement-layer (R-enh), the first enhancement-layer (L-enh) comprising a first encoded image (L') encoded using a first disparity based predictor (LpredD), the first disparity based predictor (LpredD) being based on the image information comprised in the base-layer (LeRo') and first block-based displacement vectors (LHvec) generated using disparity information present in the first and second images (L,R), the image information encoded in the base-layer (LeRo') and the first image (L), the second enhancement-layer (R-enh) comprising a second encoded image (R') encoded using a second disparity based predictor (RpredD), the second disparity based predictor (RpredD) being based on the image information comprised in the base-layer (LeRo') and second block-based displacement vectors (RHvec) generated using disparity information present in the first and second images (L,R), the image information encoded in the base-layer (LeRo') and the second image (R).

Another embodiment of the first embodiment of the method described above, wherein the enhancement-layer (L-enh, R-enh) is formed by a first enhancement-layer (L-enh) and a second enhancement-layer (R-enh), and the method further comprises:

decoding the first enhancement-layer (L-enh) using the first disparity based predictor (LpredD) forming the first reconstructed picture (L'), decoding the second enhancement layer (R-enh) using the second disparity based predictor (RpredD) forming a second reconstructed picture (R').

Another embodiment of the first embodiment of the encoder described above, wherein the enhancement-layer is formed by a first enhancement-layer (L-enh) and a second enhancement-layer (R-enh), and wherein the enhancement encoder comprises:

a second encoder for generating the first enhancement-layer (L-enh) by encoding the first image (L) using the first disparity based predictor (LpredD), a third encoder for generating the second enhancement layer (R-enh) by encoding the second image (R) using the first disparity based predictor (RpredD).

Another embodiment of the first embodiment of the decoder described above, wherein the enhancement-layer (L-enh,R-enh) is formed by a first enhancement-layer (L-enh) and a second enhancement-layer (R-enh), and the enhancement decoder comprises:

a second decoder for decoding the first enhancement-layer (L-enh) using the first disparity based predictor (LpredD) forming the first reconstructed picture (L'), a third decoder for decoding the second enhancement layer (R-enh) using the second disparity based predictor (RpredD) forming a second reconstructed picture (R').

A computer program that implements any of the methods described above and those methods in conjunction with any of the modifications described in this specification.

A software tool that implements any of the methods described above and those methods in conjunction with any of the modifications described in this specification.

The first and second images are encoded separately using a respective one of the first and second disparity based predictors. The scheme can provide full HD per eye. A reason for this is that the first and second images are encoded without prior low-pass filtering and/or sub-sampling. As such, this scheme further addresses issue A.

Optionally, the method set forth further comprises up-scaling the respective spatial halves of the image information comprised in the base-layer to respectively form a first intermediate predictor and a second intermediate predictor, both at full-resolution, encoding the first image further using the first intermediate predictor, and encoding the second image further using the first intermediate predictor.

Said measures provide additional predictors in the form of the up-scaled versions of the respective encoded images of the image pair. Advantageously, the encoding efficiency of the enhancement layer is improved.

Optionally, the base-layer is encoded using one of: an MPEG-2 encoding, an AVC encoding and an HVC encoding, or the enhancement-layer is encoded using one of: an AVC encoding and an HVC encoding. Said encoding methods are particularly well suited for encoding the base-layer and/or the enhancement layer. AVC stands for Advanced Video Coding, and HVC stand for High Efficiency Video Coding, sometimes referred to as HeVC or HEVC.

Optionally, the combined images are encoded as one of side-by-side encoded images or top-bottom encoded images. Said encoding methods are particularly well suited for encoding the combined images, e.g., for providing compatibility with existing multi-view signal receivers.

Optionally, the method set forth further comprises a step of multiplexing the base-layer, the enhancement-layer, the first block-based displacement vectors and the second block-based displacement vectors into a bit-stream. As such, a single bit-stream is provided that provides, next to a base-layer, an enhancement layer for providing enhanced resolution.

BRIEF DESCRIPTION OF THE DRAWINGS

These and further aspects of the invention will be explained in greater detail by way of example and with reference to the accompanying drawings, in which FIG. 9 shows a table providing an overview of the selected properties of the aspects and variants of the present invention.

The figures are not drawn to scale. Generally, identical components are denoted by the same reference symbols or numerals in the figures.

DETAILED DESCRIPTION OF PREFERRED EMBODIMENTS

In order to further clarify the terminology used throughout this application text, some short examples of common operations found in this application will be described.

Parity

Throughout this document "parity" is used as an attribute of pixels within an image. Parity here may take on the values even or odd. Images typically are represented as 2-dimensional arrays of samples or pixel values. In order to indicate a particular pixel value or sample typically two coordinates are used, preferably x and y, wherein x designates the horizontal and y the vertical coordinate.

Although using the coordinates x and y as indicated herein above, the actual ranges of coordinates varies; ranges may start at 0 and run up to n−1, n being the number of pixels in that direction, or alternatively may range from 1 up to n. Although this choice may appear arbitrary it effectively inverts the selecting of even/odd pixels.

Figure 1A:
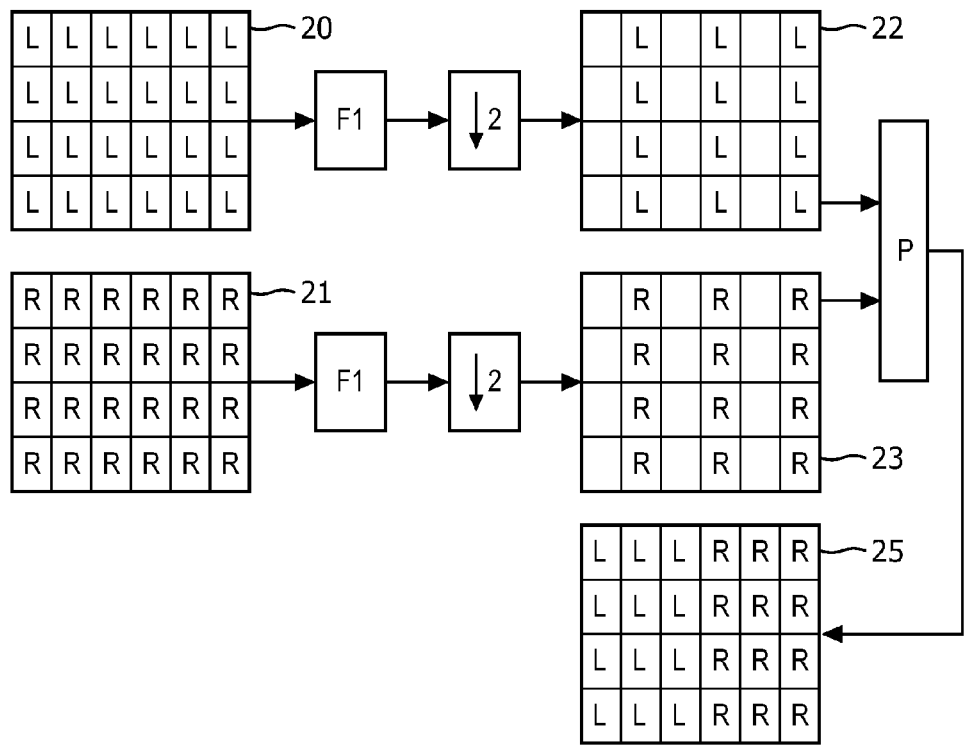
FIG. 1A shows a block diagram for generating a combined image.

Consider by means as an example FIG. 1A. Within FIG. 1A two images are presented, a left image 20 and a right image 21 at full-resolution. Consider the situation wherein we want to create a combined side-by-side image 25 at full-resolution. Here full-resolution refers to image size of the images that are originally being encoded, i.e. in this example to a resolution of 6 horizontal and 4 vertical samples or pixel values.

To properly describe the process of downscaling and combining the pixel values of the respective left image 20 and right image 21, we will here use a horizontal pixel numbering, in the example image ranging from 0 to 5.

The process of generating the down-scaled image involves applying a filter F1 to the samples in order to reduce aliasing as a result of the downscaling; followed by decimation with a factor 2. As a result the samples having odd parity remain in the downscaled left image 22 and likewise the samples having odd parity remain in the downscaled left image 23.

Following the downscaling the pixels need to be packed in the block P. As a result the columns 1,3 and 5 of the respective downscaled left and right images (22,23) are placed adjacent in the combined image 25; wherein the left pixel columns 1,3,5 are placed on pixel columns 1,2 and 3 of the combined image, and wherein the right pixel columns 1,3,5 are placed in pixel columns 3,4 and 5 of the combined image 25.

Although the example presented hereinabove relates to a situation where a combined side-by-side image is constructed it would also be possible to construct a combined Top-bottom image. In this situation the designation "odd" pixels however would refer to rows of the images rather than to columns.

The choice of side-by-side and/or Top-bottom may be relevant for a particular application but as such is not essential to the present invention. As a result throughout the application when referring to generating a combined image, the choice for side-by-side or top-bottom is left open; unless explicitly specified.

As a result it is possible to refer to the above operation on a higher level, and the above operation may be summarized as combining the odd pixels of left image 20 and the odd pixels of right image 21 by spatially co-locating the respective odd pixels in a combined image. Thereby indicating that the respective odd pixels are packed (i.e. placed adjacently), and subsequently placed adjacently corresponding to the direction of decimation (in FIG. 1A horizontally).

Using the notation adopted herein the left image 20 may also be referred to as "L", the right image 21 may also be referred to as "R", the downscaled left image may also be referred to as "Lo", the downscaled right image may also be referred to as "Ro" and the combined image may also be referred to as "LoRo".

As indicated hereinabove the exact choice of where to position the left and right image in a combined image and whether or not to start numbering pixels with 0 or 1 may be decided by convention. In order to address this the choice of even and odd parity may be even further abstracted by referring to them as a first parity being either even or odd and a second parity being either odd or even respectively.

In this manner generating a combined image based on a left and right image may be further generalized as generating a combined image wherein the combined image comprises:

samples having first parity of the first image, the samples being spatially co-located in the combined image and samples having first parity of the second image, the samples being spatially co-located in the combined image.

Reconstructing Images

Using the terminology as presented hereinabove, it is also possible to describe the operation of reconstructing two full-resolution left and a right images based on two full-resolution decoded combined images.

Figure 1B:
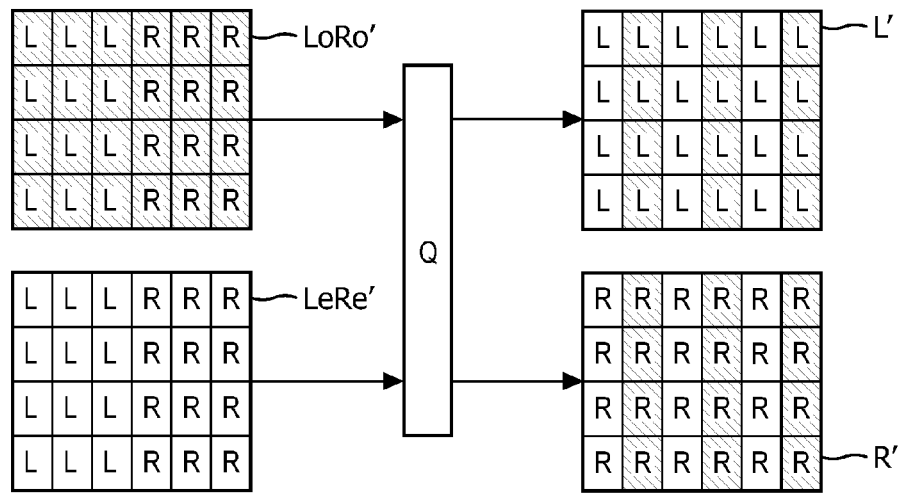
FIG. 1B shows a block diagram for reconstruction of two images based on two combined images.

FIG. 1B shows an example operation wherein a first and a second image are reconstructed (L' and R' respectively), by combining a first decoded combined image LoRo' with a second decoded combined image LeRe' using the operator Q. It is noted that the "o" following the L or R indicates that the samples contained therein are "odd" parity and the "e" following the L or R indicates that the samples contained therein are "even" parity.

Thus by means of the operator Q, spatially co-located samples from the first decoded combined image LoRo', i.e. the packed samples (which had odd parity prior to combining) indicated by L are placed in the odd locations within the reconstructed left image L'; i.e. the columns 0,1,2 from the image LoRo' are placed in the reconstructed image L' as columns 1,3 and 5. Likewise the further spatially co-located samples from the first decoded combined image LoRo', i.e. the packed samples having odd parity indicated by R are placed in the odd locations within the reconstructed right image R'.

Similarly the packed samples (which had even parity prior to combining) indicated by R are placed in the even columns of the first and second reconstructed image i.e. the columns 0,1,2 from the image LeRe' are placed in the reconstructed image L' as columns 0,2 and 4.

Using the terminology introduced herein above various embodiments in accordance with the present invention will be described next.

In accordance with first aspect of the invention an alternative method of encoding an image pair L,R is provided that also uses two encoders; a first encoder Enc1 for encoding a base-layer LR-bas and a second encoder for encoding an enhancement layer LE-enh. However, unlike the encoder system presented later on in FIG. 6A, the invention according to this first aspect uses two different combined images.

In the embodiment according to the first aspect of the invention (FIG. 2A), the base-layer encoder encodes a first combined image LeRo, which is generated based on the first image and the second image, however this time, samples having a first parity are selected from the first image and samples having a second parity are selected from the second image in the SBS-operation as indicated by the "eo" attributes on the SBS block.

Like the SBS-operation presented with reference to FIG. 1A, the SBS-operation for generating the first combined image LeRo also includes a low-pass filter having a cut-off frequency above ½ fs. This low-pass filter is denoted by the "F1" attribute on the SBS block.

In the embodiment according to the first aspect of the invention, the enhancement-layer encoder encodes a second combined image LoRe, which is generated based on the first image and the second image, however this time, samples having a second parity are selected from the first image and samples having a first parity are selected from the second image in the SBS-operation as indicated by the "oe" attributes on the SBS block.

Like the SBS-operation presented with reference to FIG. 1A, the SBS-operation for generating the first combined image LeRo also includes a low-pass filter having a cut-off frequency above ½ fs.

It should be noted that the method of encoding/decoding in accordance with this first aspect of the invention cannot provide full HD resolution for both eyes. This is not possible as a result of the low-pass filter which is applied within the generation of LeRo and LoRe.

The base-layer in the encoder system according to the first aspect of the invention is generated by encoding the first combined image LeRo. The image information encoded in the base layer, LeRo' is subsequently used to generate a disparity based predictor LoRepredD. This disparity based predictor LoRepredD is subsequently used in order to generate the enhancement layer LR-enh by encoding the second combined image LoRe using the disparity based predictor as predictor input. As indicated in FIG. 2A, further predictors such as the image information as encoded within the base-layer LeRo' may be used to more efficiently encode the second combined image LoRe.

The first aspect of the invention is based on the fact that at the encoder side additional information is provided that may enable the construction of a predictor that provides additional information for encoding the second combined image than the image information encoded within the base-layer LeRo'.

In accordance with the first aspect of the invention first and second block-based displacement vectors LHvec and RHvec are generated associated with the image information encoded in the base layer LeRo', for use in constructing a first and second full-resolution predictor Lpred and Rpred. The first and second block-based displacement vectors are generated using disparity information present in the first and second images L, R, and indicate how image information in the base-layer LeRo' may be used to construct the disparity based predictor used for encoding the enhancement layer.

Figure 2A:
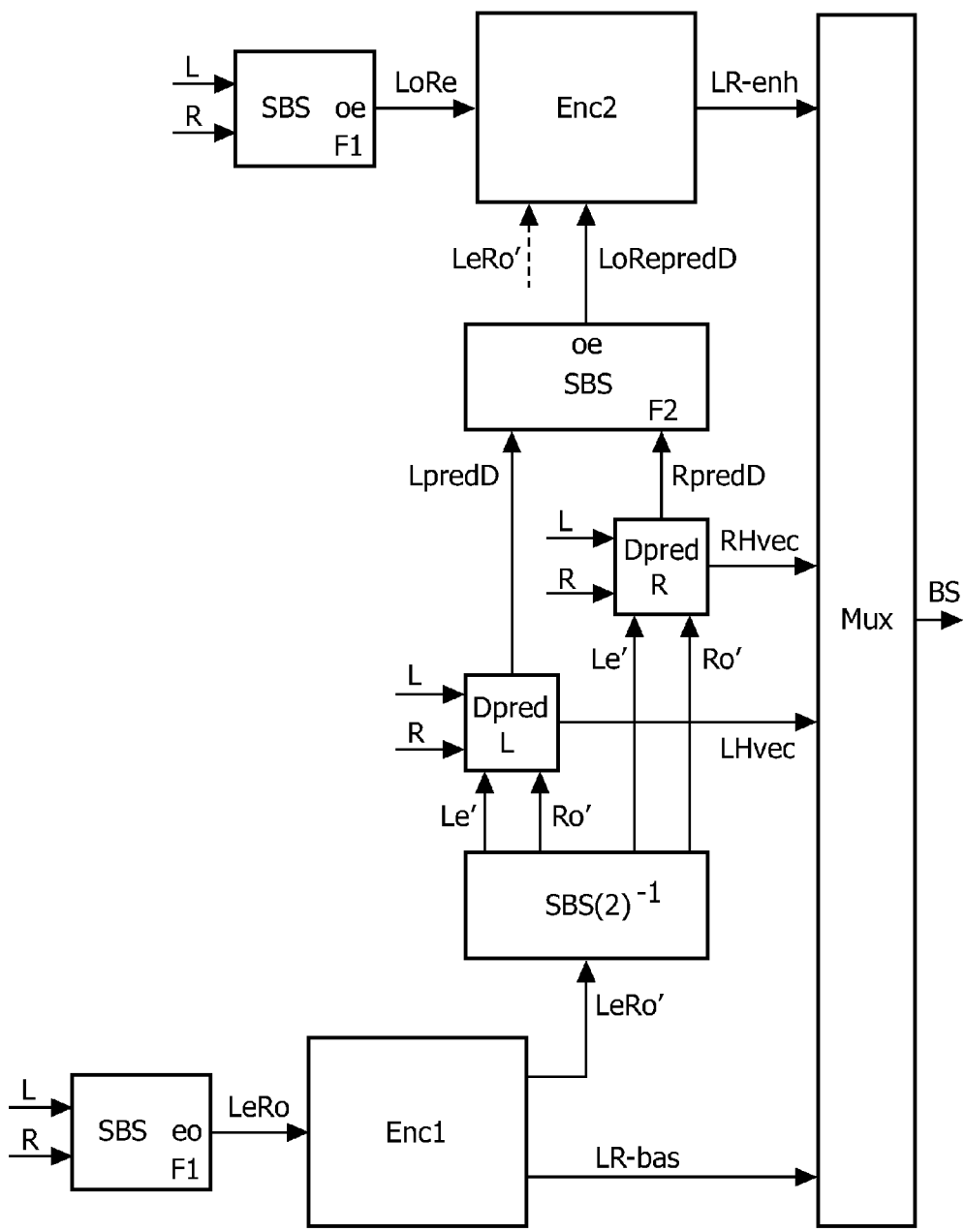
FIG. 2A shows a block diagram of an encoder in accordance with the present invention.
Figure 4:
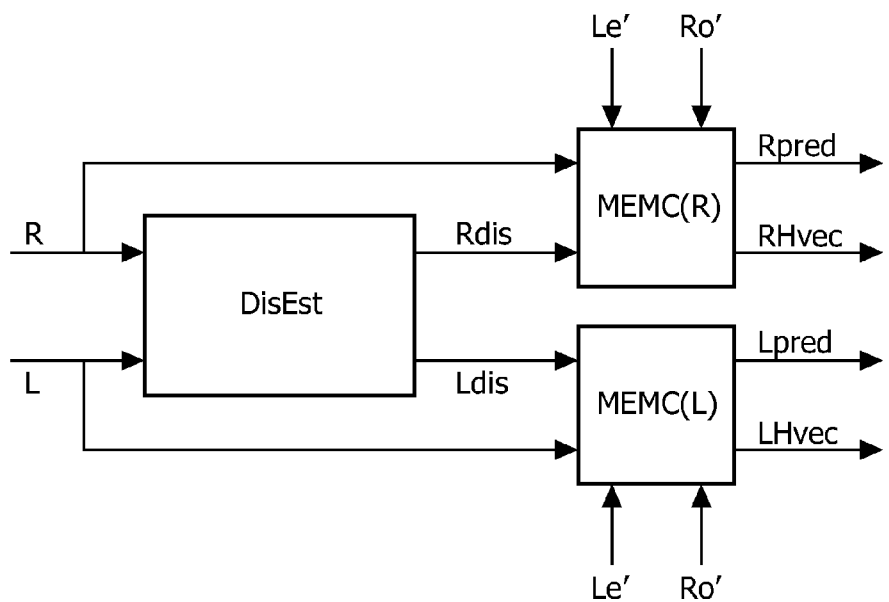
FIG. 4 shows a block diagram of a disparity estimator and block-based disparity generator.

Preferably, the disparity based predictor (LoRepredD) is generated in a three-stage approach, as shown in FIG. 2A and FIG. 4. First an initial block based disparity estimation is conducted on the first image L and the second image R, resulting in first displacement values Ldis and second displacement value Rdis, wherein the first displacement values Ldis indicate how to shift the second image R towards the first image L in order for R to match L. Likewise the second displacement values Rdis indicate how to shift the first image L towards the second image R in order for L to match R. (FIG. 4).

The first and second displacement values Ldis and Rdis in turn are used to generate a first full resolution disparity predictor LpredD and RpredD respectively. To this end the MEMC(L) and MEMC(R) blocks refine the first and second displacement values Ldis and Rdis.

To this end the MEMC(L)/(R) blocks apply the shift on one of the inputs (Le' or Ro') at half res, e.g. MEMC(L) applies a shift from Ro' towards the other input Le' at half the resolution and interleaves the pixels of one block in order to minimize the residual energy LpredD with the corresponding full resolution image L.

At this point two choices can be made; a first choice may be to encode both Ldis and Rdis in the bit-stream and to encode the refinement resulting from the MEMC blocks based on Ldis and Rdis. The advantage of doing so is that this adds disparity/depth information to the encoded stream, which in turn may be used for variable baseline processing, and/or may be helpful in post-processing in general, and in e.g. subtitling and/or compositing in particular. Alternatively the vectors can be encoded without encoding Ldis and Rdis explicitly.

Once the first and second full resolution predictor images LpredD and RpredD have been constructed in the above manner, the first and second full resolution predictor images are combined into a third full resolution predictor image using a SBS-operation, selecting the second parity samples from the low-pass filtered first image L and the first parity samples from the second image R, as indicated by the "oe" attribute. As indicated by the "F2" attribute the SBS operator involves a low-pass filter, the low-pass filter F2 is weaker than the low pass filter F1 and the low-pass filter F2 has a cut off frequency above ½ fs.

Unfortunately the predicted images as generated using the above approach have a block-based nature and as a result are typically less suitable for replacing the image information as encoded in the base-band layer.

Subsequently, the enhancement-layer LR-enh may be generated by encoding the second combined image LoRe using the disparity based predictor LoRepredD.

As will be discussed with reference to FIG. 6A, the base-layer may be encoded using e.g. one of an MPEG-2, an AVC, or a HVC encoding scheme as known to those skilled in the art of video compression. In turn the enhancement-layer encoder may be chosen to use e.g. one of an AVC, or HVC encoding scheme.

Likewise, preferably the multi-view signal is a stereo signal wherein the combined images are encoded as side-by-side encoded images or top-bottom encoded images.

In a preferred embodiment the spatially co-located samples having the first parity correspond with a first half of the combined images and the spatially co-located samples having the second parity correspond with a second half of the combined images.

In a preferred embodiment the multi-view signal is a video sequence.

In a preferred embodiment the first low pass filtered version of the first image and the second low pass filtered version of the first image are one and the same image. Likewise the first low pass filtered version of the second image and the second low pass filtered version of the second image are one and the same image.

As indicated within FIG. 2A, a method in accordance with the invention may further comprise a step of multiplexing the base-layer, the enhancement-layer, the first block-based displacement vectors and the second block-based displacement vectors into a bit-stream BS.

In addition a method in accordance with the invention may also comprise a step of broadcasting, transmitting and/or storing the bit-stream BS.

It will be appreciated that in an alternative configuration of the encoder, the base-layer encoder may encode the first combined image, which is generated based on the first image and the second image, with samples having a first parity being selected from the first image and samples having a same first parity being selected from the second image in an SBS-operation which may be indicated by an "ee" attribute on an SBS block.

Moreover, the enhancement-layer encoder may encode the second combined image, which is generated based on the first image and the second image, with samples having a second parity being selected from the first image and samples having also a same second parity being selected from the second image in an SBS-operation which may be indicated by an "oo" attribute on an SBS block.

Lastly, once the first and second full resolution predictor images LpredD and RpredD have been constructed in the previously mentioned manner, the first and second full resolution predictor images may be combined into a third full resolution predictor image, using an SBS-operation in which the second parity samples are selected from the low-pass filtered first image L and also the second parity samples are selected from the second image R, which may be indicated by an "oo" attribute on an SBS block.

The resulting bit-stream BS thus comprises an encoded image pair corresponding with two views of a multi-view signal, i.e. a base-layer LR-bas, the base-layer comprising an encoded first combined image LeRo' being encoded using a first encoder. It further includes an enhancement-layer LR-enh, the enhancement-layer comprising an encoded second combined image LoRe' being encoded using a second encoder and using a predictor input based on the decoded encoded first combined image LeRo'.

The encoded first combined image LeRo' in turn is based on a first combined image LeRo, the first combined image LeRo based on a first low pass filtered version of a first image of an original image pair and a first low-pass filtered version of a second image of the original image pair, the first combined image LeRo comprising samples having a first parity from the first low-pass filtered version of the first image, the samples being spatially co-located in the encoded first combined image and samples having a second parity from the first low-pass filtered version of the second image, the samples being spatially co-located in the encoded first combined image.

The encoded second combined image LoRe' in turn is based on a second combined image LoRe, the second combined image LoRe based on a second low pass filtered version of the first image of the original image pair and a second low-pass filtered version of the second image of the original image pair, the second combined image LoRe comprising: samples having second parity from the second low-pass filtered version of the first image the samples being spatially co-located in the second combined image and samples having first parity from the second low-pass filtered version of the second image the samples being spatially co-located in the second combined image.

In addition the bit-stream BS comprises first and second block-based displacement vectors associated with the image information encoded in the base layer LeRo', the first and second block-based displacement vectors generated using disparity information present in the first and second images L,R, the image information encoded in the base-layer LeRo' and the first and second images L,R.

Figure 2B:
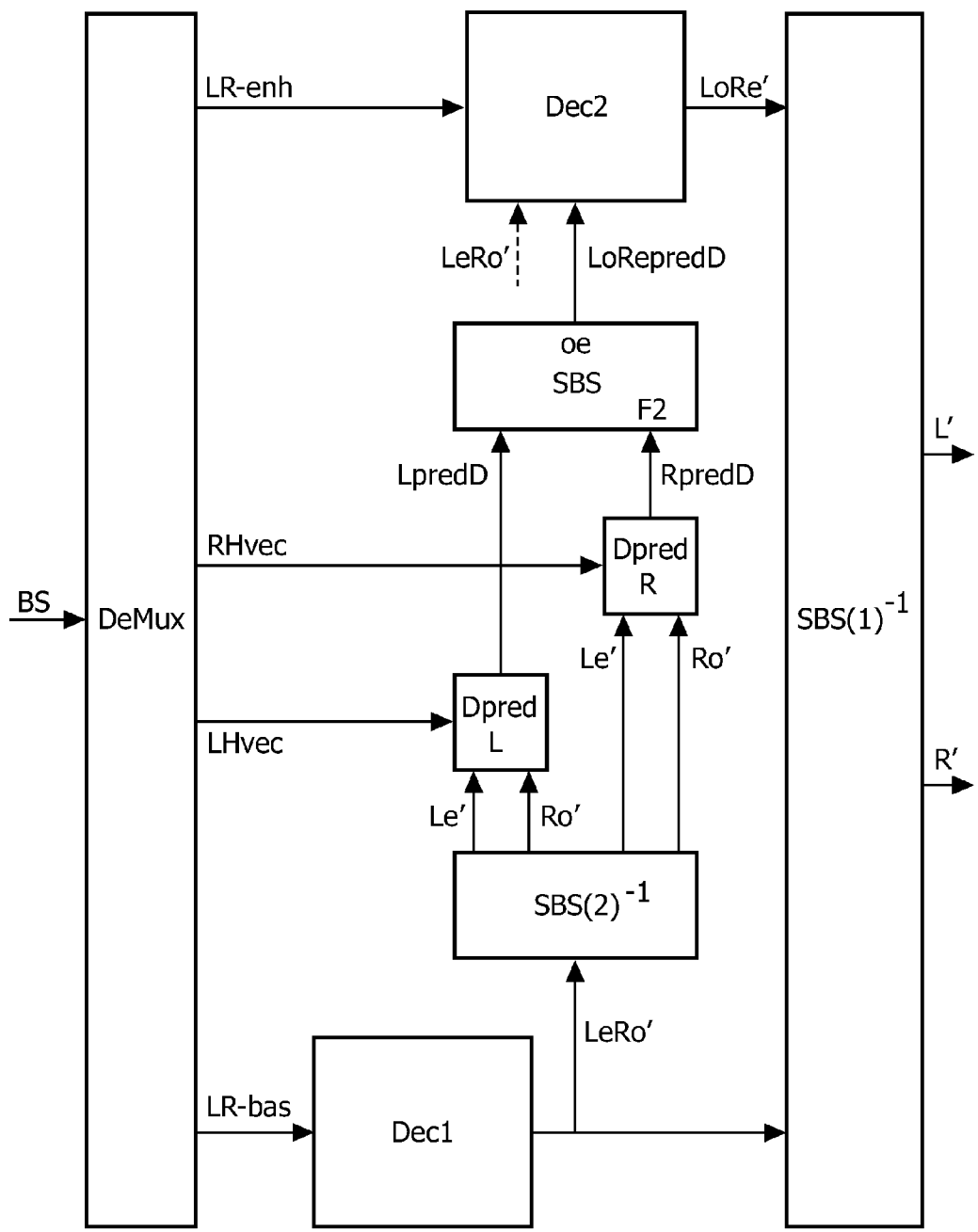
FIG. 2B shows a block diagram of a decoder in accordance with the present invention.

FIG. 2B provides a decoding system in accordance with the first aspect of the invention for decoding an image pair (L,R) corresponding with two views of a multi-view signal.

The decoding system is arranged to receive a bit-stream BS, which in turn may be de-multiplexed in order to provide access to the base-layer LR-bas and the enhancement layer LR-enh. In addition the demultiplexer provides the first and second block-based displacement vectors LHvec,RHvec for use in generating a disparity based predictor (LoRepredD) for use in decoding the enhancement layer.

In a preferred embodiment the decoder according to the first aspect of the invention is arranged to execute a method of decoding comprising generating a first decoded combined image LeRo' by decoding the base-layer LR-bas, generating a disparity based predictor LoRepredD for use in decoding an enhancement layer using first and second block-based displacement vectors (LHvec,RHvec) in combination with the first decoded combined image LeRo'. The method further comprises generating a second decoded combined image LoRe' by decoding the enhancement-layer LR-enh using the disparity based predictor LoRepredD.

Next the reconstruction of the first and second reconstructed images L' and R' may commence.

Reconstructing the first reconstructed image L' comprises using spatially co-located samples in the first decoded combined image LeRo' as samples having a first parity in the first reconstructed image L' and using spatially co-located samples in the second decoded combined image LoRe' as samples having a second parity in the first reconstructed image L', thereby forming the first reconstructed image L'.

Reconstructing the second reconstructed image R' comprises using further spatially co-located samples in the first decoded combined image LeRo' as samples having a second parity in the second reconstructed image R' and using further spatially co-located samples in the second decoded combined image LoRe' as samples having a first parity in the second reconstructed image R', thereby forming the second reconstructed image R'.

As discussed hereinabove with respect to the first aspect of the present invention, it may be possible during encoding and decoding of an image pair, to capitalize on the fact that during encoding two images are available; derived from both left and right, which may be used to improve a predictor.

Although as indicated earlier the maximum quality achievable using the methods of encoding presented previously approaches that of Full HD resolution, it is not possible to actually achieve this quality. However, using similar techniques, it is possible to actually achieve full HD encoding/decoding at the cost of one additional encoder, and/or if implemented time sequentially using a further image reconstruction step.

A second aspect of the present invention aims to encode a base-layer and based thereon generate two high quality full-resolution predictors; i.e. one for encoding and (during decoding later on) reconstructing the left image and one for encoding and (during decoding later on) reconstructing the right image. These predictors are preferably formed either using disparity based predictors as discussed with reference to FIG. 2A.

The advantage of using the disparity based predictors more over means that by adding disparity information to the encoded stream it will be easier to perform variable base-line processing on account of the fact that disparity information is included in the stream for use at the decoder side.

This information may be used to e.g. process the reconstructed left and right image so as to adapt the view points of the respective images. Principles for processing stereo image pairs based on depth are e.g. disclosed in International Patent Application WO/2010/010521 entitled "VERSATILE 3-D PICTURE FORMAT" by the same applicant, hereby incorporated by reference and "Intermediate View Generation for Perceived Depth Adjustment of Stereo Video", by Zafer Arican, et al. Mitsubishi Electric Research Laboratories [TR2009-052], hereby incorporated by reference.

Figure 5:
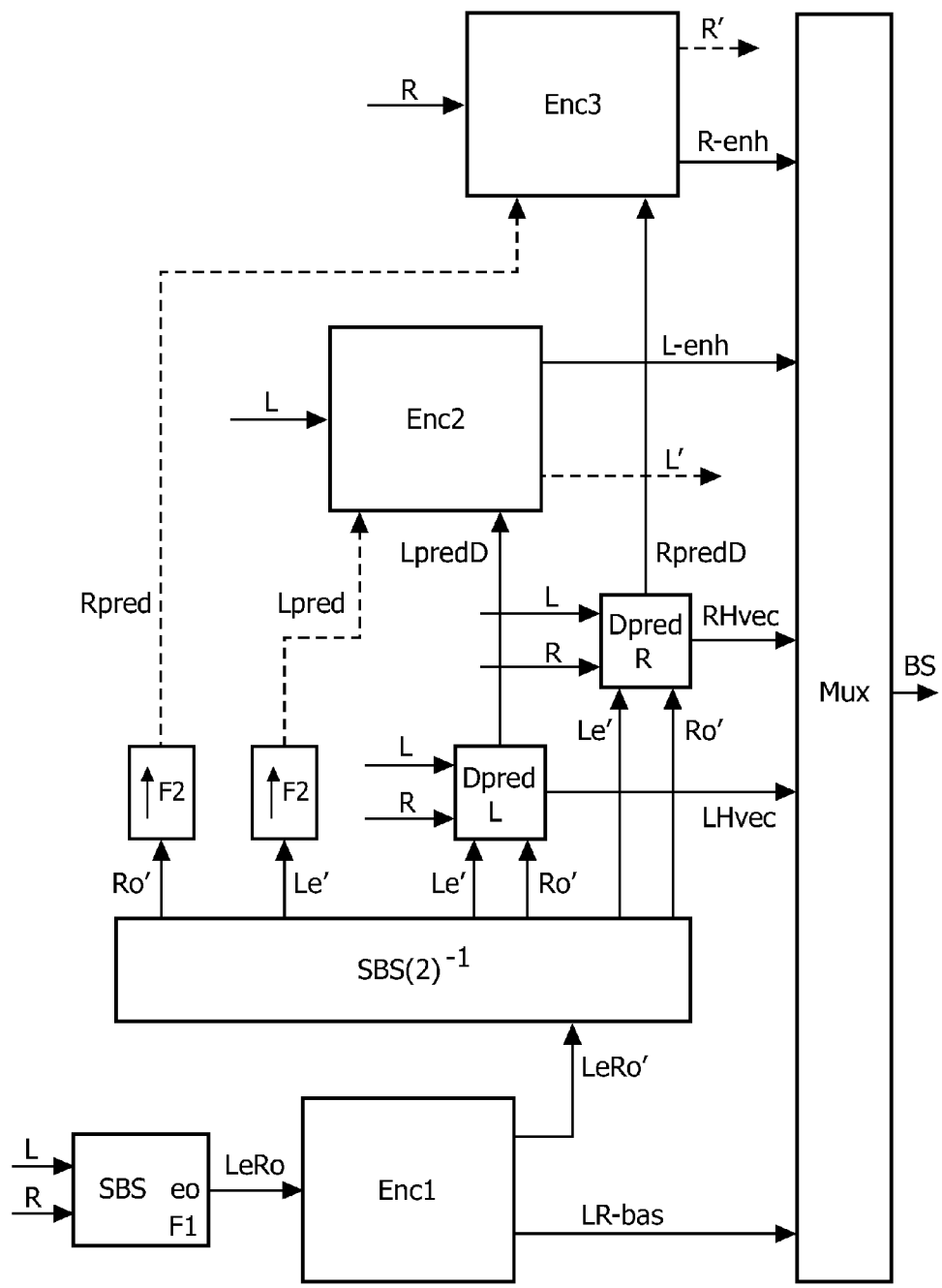
FIG. 5 shows a block diagram of an encoder in accordance with the present invention and FIG. 6A shows a block diagram of an encoder in accordance with the present invention.

FIG. 5 shows an encoder system arranged to conduct a method according to the present invention. The encoder system in FIG. 5 shows substantial overlap with the encoder system as described with reference to FIG. 2A. In particular the generation of base-layer, the first combined image LeRo, the first disparity based predictor LpredD, the second disparity based predictor RpredD and the first and second block-based displacement vectors (LHvec,RHvec) associated with the image information encoded in the base layer (LeRo') are generated in a similar manner.

In accordance with FIG. 5 these predictors are subsequently used to generate a first enhancement-layer L-enh by encoding the first image L using the first disparity based predictor LpredD and generating a second enhancement layer R-enh by encoding the second image R using the second disparity based predictor RpredD.

More preferably two further full resolution predictors are generated in order to aid the encoding of the enhancement layers. To this end the respective spatial halves of the image information comprised in the base-layer LeRo' are upscaled by a factor of 2 to respectively form a first intermediate predictor Lpred and a second intermediate predictor Rpred, both at full-resolution, As indicated using the attribute "F2", the up-scaling filters involve upsampling followed by a low-pass filter. It is noted that the upscaler preferably takes into account the parity of the input when up-scaling.

The advantage of using the scheme according to the second aspect is that it can encode and subsequently decode true HD resolution for each view.

It is noted that the predictors for generating the enhancement layers, although at full-resolution are on account of the block based encoding of the disparity information, not suitable to be watched directly.

Although not indicated in FIG. 5, it is further noted that it may be possible to use one of the first and second reconstructed images L' and R', which typically are side products of encoding the first and the second base-layer, as a further predictor for use in encoding the other.

In addition it is possible to use one or more delayed copies of the first reconstructed image L', i.e. previously reconstructed images, as further predictor(s) for encoding the second enhancement-layer. Likewise, it is further more possible to use one or more delayed copies of the second reconstructed image R' as further predictor(s) for encoding the first enhancement layer.

It is further noted that the base-layer may e.g. be encoded using an MPEG-2 encoding scheme, an AVC encoding scheme or an HVC encoding scheme as known to those skilled in the art. Likewise the respective first and second enhancement-layer may e.g. be encoded using an AVC encoding or an HVC encoding scheme.

Typically the multi-view signal is a stereo signal. And more typically, the combined images are encoded as side-by-side encoded images or top-bottom encoded images.

It is further noted that preferably the spatially co-located samples having the first parity correspond with a first half of the combined images and the spatially co-located samples having the second parity correspond with a second half of the combined images.

Typically the multi-view signal is a video sequence.

Preferably the low-pass filtering of the first and/or the second image using the "F1" filter as indicated by the F1 attribute of the SBS block in FIG. 5 comprises filtering using one or more filters combined, the one or more filters combined having a cut-off frequency above ½ fs.

A method of encoding according to the second aspect preferably comprises a step of multiplexing the base-layer, the first enhancement-layer, the second enhancement layer, the first block-based displacement vectors and the second block-based displacement vectors into a bit-stream BS.

Optionally the method further comprises a step of broadcasting the bit-stream BS.

A bit-stream BS in accordance with the second aspect of the invention comprises an encoded image pair corresponding with two views of a multi-view signal. The bit-stream thus includes a base-layer LR-bas, the base-layer comprising an encoded first combined image LeRo' being encoded using a first encoder.

The bit-stream further comprises two enhancement layers; a first enhancement-layer L-enh, the first enhancement-layer comprising a first encoded image L' encoded using a first disparity based predictor LpredD and an optional first intermediate predictor Lpred. Wherein the first intermediate predictor LPred is based on up-scaling a first spatial half of the image information comprised in the base-layer LeRo' and the first disparity based predictor LpredD is based on the image information comprised in the base-layer LeRo' and first block-based displacement vectors generated using disparity information present in the first and second images L,R, the image information encoded in the base-layer LeRo' and the first image L.

The bit-stream further comprises a second enhancement-layer R-enh, the second enhancement-layer comprising a second encoded image R' encoded using a second disparity based predictor RpredD and an optional second intermediate predictor Rpred. Wherein the second intermediate predictor Rpred based on up-scaling a second spatial half of the image information comprised in the base-layer LeRo' and the second disparity based predictor RpredD is based on the image information comprised in the base-layer LeRo' and second block-based displacement vectors generated using disparity information present in the first and second images L,R, the image information encoded in the base-layer LeRo' and the second image R.

Moreover in order to reconstruct the LpredD and the RpredD predictors the bit-stream further includes the first block-based displacement vectors and the second block-based displacement vectors.

As there is substantial overlap between the encoding in accordance with the second aspect and the encoder as discussed with reference to FIG. 2A, the decoding process also shows substantial similarity. In view of this similarity the decoder corresponding with the encoder system of FIG. 5 has not been fully drawn out. However, the generation of the first and second disparity based predictors LpredD and RpredD are substantially in line with those discussed with reference to FIG. 2B.

For the sake of completeness, however a decoding system arranged to implement the method of decoding in accordance with the second aspect of the present invention comprises generating a first decoded combined image LeRo' by decoding a base-layer, it may optionally also include up-scaling the respective spatial halves of the image information comprised in the base-layer LeRo' to respectively form a first intermediate predictor Lpred and a second intermediate predictor Rpred, both at full-resolution.

The method further comprises generating a first and second disparity based predictor LpredD, RpredD for use in respectively encoding a first and a second enhancement layer Lenh, Renh and respectively associated first and second block-based displacement vectors LHvec, RHvec associated with the image information encoded in the base layer LeRo', the first and second block-based displacement vectors generated using disparity information present in the first and second images L,R, the image information encoded in the base-layer LeRo' and the respective first and second images L,R.

The method further comprises decoding a first enhancement-layer L-enh using the first disparity based predictor LpredD and optionally using the first intermediate predictor Lpred, thus forming a first reconstructed picture L'.

The method further comprises decoding a second enhancement layer R-enh using the second disparity based predictor RpredD and optionally the second intermediate predictor Rpred, thus forming a second reconstructed picture R'.

Preferably the decoded multi-view signal is a stereo signal. More preferably the first decoded combined image LeRo' is a side by side encoded image or the first decoded combined image LeRo' is a top-bottom encoded image.

Optionally the method of decoding further comprises receiving a broadcasted bit-stream BS, wherein more optionally the method further comprises de-multiplexing the received bit-stream in order to obtain the base-layer, the first enhancement layer, the second enhancement layer, the first block-based displacement vectors LHvec and the second block-based displacement vectors RHvec.

FIG. 9 shows a table providing an overview of the selected properties of the aspects and variants of the present invention.

Further Embodiments of the Invention

Further embodiments of the invention can be described in reference to the following clauses.

Clause 101. A method of encoding an image pair (L,R) corresponding with two views of a multi-view signal the method comprising:

generating a first combined image (LeRo) based on a first low pass filtered version of a first image of the image pair and a first low-pass filtered version of the second image of the image pair, the first combined image (LeRo) comprising:
  samples having a first parity from the first low-pass filtered version of the first image, the samples being spatially co-located in the first combined image and
  samples having a second parity from the first low-pass filtered version of the second image, the samples being spatially co-located in the first combined image, generating a second combined image (LoRe) based on a second low pass filtered version of the first image of the image pair and a second low-pass filtered version of the second image of the image pair, the second combined image (LoRe) comprising:
  samples having second parity from the second low-pass filtered version of the first image the samples being spatially co-located in the second combined image and
  samples having first parity from the second low-pass filtered version of the second image the samples being spatially co-located in the second combined image, generating a base-layer (LR-bas) by encoding the first combined image (LeRo), generating a disparity based predictor (LoRepredD) for use in encoding the enhancement layer and first and second block-based displacement vectors (LHvec,RHvec) with associated with the image information in the encoded in the base layer (LeRo'), the first and second block-based displacement vectors generated using disparity information present in the first and second images (L,R), the image information encoded in the base-layer (LeRo') and the first and second images (L,R), generating an enhancement-layer (LR-enh) by encoding the second combined image (LoRe) using the disparity based predictor.

Clause 102. The method of clause 101, wherein generating the disparity based predictor (LoRepredD) comprises generating:

a first full resolution disparity predictor (LpredD) and the first block-based displacement vectors (LHvec) based on
  the image information encoded in the base-layer (LeRo'),
  the first image (L) and
  disparity information derived from the first and second images and
a second full resolution disparity predictor (RpredD) and the second block-based displacement vectors (RHvec) based on
  the image information encoded in the base-layer (LeRo'), the second image (R) and disparity information derived from the first and second images.

Clause 103. The method of clause 102, wherein generating the block-based displacement vectors comprises:

generating an initial disparity estimation (Ldis, Rdis) using the first and second images (L,R) and generating block-based displacement vectors (LHvec, RHvec) associated with the respective the full resolution disparity predictors (LpredD, RpredD) using the initial disparity estimation (Ldis,Rdis).

Clause 104. The method of anyone of clauses 102-103, wherein generating the disparity based predictor (LoRepredD) further comprises:

combining the first full-resolution disparity predictor (LpredD) and the second full-resolution disparity based predictor (RpredD) into the disparity based predictor (LoRepredD), the disparity based predictor (LoRepredD) comprising:

samples having second parity from the first full-resolution disparity predictor of the first image, the samples being spatially co-located in the disparity based predictor (LoRepredD) and samples having first parity from the second full-resolution disparity predictor of the second image, the samples being spatially co-located in the disparity based predictor (LoRepredD).

Clause 105. The method of any one of the clauses 101-104, wherein the base-layer is encoded using one of:

an MPEG-2 encoding
an AVC encoding and
an HVC encoding.

Clause 106. The method of any one of the clauses 101-105, wherein the enhancement-layer is encoded using one of:

an AVC encoding and
an HVC encoding.

Clause 107. The method of any one of the clauses 101-106, wherein the multi-view signal is a stereo signal.

Clause 108. The method of clause 108, wherein the combined images are encoded as one of:

side-by-side encoded images or
top-bottom encoded images.

Clause 109. The method of any one of the clauses 101-108, wherein the spatially co-located samples having the first parity correspond with a first half of the combined images and wherein the spatially co-located samples having the second parity correspond with a second half of the combined images.

Clause 110. The method of any one of the clauses 101-109, wherein the multi-view signal is a video sequence.

Clause 111. The method of any one of the clauses 101-110, wherein the first low pass filtered version of the first image and the second low pass filtered version of the first image are one and the same image.

Clause 112. The method of any one of the clauses 101-111, wherein the first low pass filtered version of the second image and the second low pass filtered version of the second image are one and the same image.

Clause 113. The method of any one of the clauses 101-112, where low-pass filtering of the first and/or the second image comprises filtering using one or more filters combined, the one or more filters combined having a cut-off frequency above ½ fs.

Clause 114. The method of any one of the clauses 101-113, further comprising a step of multiplexing the base-layer, the enhancement-layer, the first block-based displacement vectors and the second block-based displacement vectors into a bit-stream (BS).

Clause 115. The method of any one of the clauses 101-114, further comprising a step of broadcasting the bit-stream (BS).

Clause 120. A bit-stream (BS) comprising an encoded image pair corresponding with two views of a multi-view signal:

a base-layer (LR-bas), the base-layer comprising an encoded first combined image (LeRo') being encoded using a first encoder, an enhancement-layer (LR-enh), the enhancement-layer comprising an encoded second combined image (LoRe') being encoded using a second encoder and using a predictor input based on the decoded encoded first combined image (LeRo'), wherein the encoded first combined image (LeRo') based on a first combined image (LeRo), the first combined image (LeRo) based on a first low pass filtered version of a first image of an original image pair and a first low-pass filtered version of a second image of the original image pair, the first combined image (LeRo) comprising:

samples having a first parity from the first low-pass filtered version of the first image, the samples being spatially co-located in the encoded first combined image and samples having a second parity from the first low-pass filtered version of the second image, the samples being spatially co-located in the encoded first combined image, the encoded second combined image (LoRe') based on a second combined image (LoRe), the second combined image (LoRe) based on a second low pass filtered version of the first image of the original image pair and a second low-pass filtered version of the second image of the original image pair, the second combined image (LoRe) comprising:

samples having second parity from the second low-pass filtered version of the first image the samples being spatially co-located in the second combined image and samples having first parity from the second low-pass filtered version of the second image the samples being spatially co-located in the second combined image, first and second block-based displacement vectors associated with associated with the image information in the encoded in the base layer (LeRo'), the first and second block-based displacement vectors generated using disparity information present in the first and second images (L,R), the image information encoded in the base-layer (LeRo') and the first and second images (L,R).

Clause 130. A method of decoding an image pair (L,R) corresponding with two views of a multi-view signal the method comprising:

generating a first decoded combined image (LeRo') by decoding a base-layer, generating a disparity based predictor (LoRepredD) for use in decoding an enhancement layer using first and second block-based displacement vectors (LHvec,RHvec) in combination with the first decoded combined image (LeRo'), generating a second decoded combined image (LoRe') by decoding an enhancement-layer (LR-enh) using the disparity based predictor (LoRepredD), reconstructing a first reconstructed image (L')

using spatially co-located samples in the first decoded combined image (LeRo') as samples having a first parity in the first reconstructed image (L') and using spatially co-located samples in the second decoded combined image (LoRe') as samples having a second parity in the first reconstructed image (L'), thereby forming the first reconstructed image (L'), and reconstructing a second reconstructed image (R')

using further spatially co-located samples in the first decoded combined image (LeRo') as samples having a second parity in the second reconstructed image (R') and using further spatially co-located samples in the second decoded combined image (LoRe') as samples having a first parity in the second reconstructed image (R'), thereby forming the second reconstructed image.

Clause 131. The method according to clause 130, wherein:

the samples having the first parity in the first reconstructed image (L') are formed by a first spatial half of the first decoded combined image (LeRo') and the samples having the second parity in the first reconstructed image (L') are formed by a first spatial half of the second decoded combined image (LoRe').

Clause 132. The method according to clause 131, wherein:

the samples having the second parity in the second reconstructed image (R') are formed by a second spatial half of the first decoded combined image (LeRo') and the samples having the first parity in the second reconstructed image (R') are formed by a second spatial half of the second decoded combined image (LoRe').

Clause 133. The method according to any one of clauses 130-132, wherein the multi-view signal is a stereo signal.

Clause 134. The method according to clause 133, wherein:

the first and second decoded combined images (LeRo', LoRe') are side by side encoded images and the first and second decoded combined images (LeRo', LoRe') are top-bottom encoded images.

Clause 135. The method of any one of the clauses 130-134, further comprising receiving a broadcasted bit-stream (BS).

Clause 136. The method of any one of the clauses 130-135, further comprising de-multiplexing a received bit-stream in order to obtain the base-layer, the enhancement layer, the first block-based displacement vectors (LHvec) and second block-based displacement vectors (RHvec).

Clause 150. An encoder for encoding an image pair (L,R) corresponding with two views of a multi-view signal the method comprising:

a first generator for generating a first combined image (LeRo) based on a first low pass filtered version of a first image of the image pair and a first low-pass filtered version of the second image of the image pair, the first combined image (LeRo) comprising:

samples having a first parity from the first low-pass filtered version of the first image, the samples being spatially co-located in the first combined image and samples having a second parity from the first low-pass filtered version of the second image, the samples being spatially co-located in the first combined image, a second generator for generating a second combined image (LoRe) based on a second low pass filtered version of the first image of the image pair and a second low-pass filtered version of the second image of the image pair, the second combined image (LoRe) comprising:

samples having second parity from the second low-pass filtered version of the first image the samples being spatially co-located in the second combined image and samples having first parity from the second low-pass filtered version of the second image the samples being spatially co-located in the second combined image, a first encoder (Enc1) for generating a base-layer (LR-bas) by encoding the first combined image (LeRo), a third generator for generating a disparity based predictor (LoRepredD) for use in encoding the enhancement layer and first and second block-based displacement vectors (LHvec, RHvec) with associated with the image information in the encoded in the base layer (LeRo'), the first and second block-based displacement vectors generated using disparity information present in the first and second images (L,R), the image information encoded in the base-layer (LeRo') and the first and second images (L,R), a second encoder (Enc2) generating an enhancement-layer (LR-enh) by encoding the second combined image (LoRe) using the disparity based predictor.

Clause 151. A decoder for decoding an image pair (L,R) corresponding with two views of a multi-view signal the method comprising:

a first decoder for generating a first decoded combined image (LeRo') by decoding a base-layer, a first generator for generating a disparity based predictor (LoRepredD) for use in decoding an enhancement layer using first and second block-based displacement vectors (LHvec, RHvec) in combination with the first decoded combined image (LeRo'), a second decoder for generating a second decoded combined image (LoRe') by decoding an enhancement-layer (LR-enh) using the disparity based predictor (LoRepredD), a first reconstructor for reconstructing a first reconstructed image (L')

using spatially co-located samples in the first decoded combined image (LeRo') as samples having a first parity in the first reconstructed image (L') and using spatially co-located samples in the second decoded combined image (LoRe') as samples having a second parity in the first reconstructed image (L'), thereby forming the first reconstructed image (L'), and a second reconstructor for reconstructing a second reconstructed image (R')

using further spatially co-located samples in the first decoded combined image (LeRo') as samples having a second parity in the second reconstructed image (R') and using further spatially co-located samples in the second decoded combined image (LoRe') as samples having a first parity in the second reconstructed image (R'), thereby forming the second reconstructed image.

Clause 160. A computer program product on a computer readable medium, the product comprising instructions for executing at least one of the methods of clauses 101-115 or 130-136.

Clause 161. A software tool for executing at least one or more methods of clauses 101-115 or 130-136, wherein the software tool comprises instructions for executing the at least one or more methods.

Clause 201. A method of encoding an image pair (L,R) corresponding with two views of a multi-view signal the method comprising:

generating a first combined image (LeRo) based on a first low pass filtered version of a first image of the image pair and a first low-pass filtered version of the second image of the image pair, the first combined image (LeRo) comprising:

samples having a first parity from the first low-pass filtered version of the first image, the samples being spatially co-located in the first combined image and samples having a second parity from the first low-pass filtered version of the second image, the samples being spatially co-located in the first combined image, generating a base-layer (LR-bas) by encoding the first combined image (LeRo), up-scaling the respective spatial halves of the image information comprised in the base-layer (LeRo') to respectively form a first intermediate predictor (Lpred) and a second intermediate predictor (Rpred), both at full-resolution, generating a first and second disparity based predictor (LpredD, RpredD) for use in respectively encoding a first and a second enhancement layer (Lenh,Renh) and respectively associated first and second block-based displacement vectors (LHvec,RHvec) associated with the image information encoded in the base layer (LeRo'), the first and second block-based displacement vectors generated using disparity information present in the first and second images (L,R), the image information encoded in the base-layer (LeRo') and the respective first and second images (L,R), generating a first enhancement-layer (L-enh) by encoding the first image (L) using the first disparity based predictor (LpredD) and first intermediate predictor (Lpred), generating a second enhancement layer (R-enh) by encoding the second image (R) using the first disparity based predictor (RpredD) and first intermediate predictor (Rpred).

Clause 202. The method of clause 201, wherein generating the first disparity based predictors (LpredD) comprises generating first block-based displacement vectors (LHvec) based on the image information encoded in the base-layer (LeRo'), the first image (L) and disparity information derived from the first and second images and generating the second disparity based predictors (RpredD) comprises generating first block-based displacement vectors (RHvec) based on the image information encoded in the base-layer (LeRo'), the first image (R) and disparity information derived from the first and second images.

Clause 203. The method of clause 202, wherein generating the block-based displacement vectors (LHVec,RHVec) comprises:

generating an initial disparity estimation (Ldis, Rdis) using the first and second images (L,R) and generating block-based displacement vectors (LHvec, RHvec) associated with the respective the full resolution disparity predictors (LpredD, RpredD) using the initial disparity estimation (Ldis,Rdis).

Clause 204. The method of any one of the clauses 201-203, wherein the base-layer is encoded using one of:
 an MPEG-2 encoding
 an AVC encoding and
 an HVC encoding.

Clause 205. The method of any one of the clauses 201-204, wherein the respective first and second enhancement-layer are encoded using one of:
 an AVC encoding and
 an HVC encoding.

Clause 206. The method of any one of the clauses 201-205, wherein the multi-view signal is a stereo signal.

Clause 207. The method of clause 206, wherein the combined images are encoded as one of:
 side-by-side encoded images or
 top-bottom encoded images.

Clause 208. The method of any one of the clauses 201-207, wherein the spatially co-located samples having the first parity correspond with a first half of the combined images and wherein the spatially co-located samples having the second parity correspond with a second half of the combined images.

Clause 209. The method of any one of the clauses 201-208, wherein the multi-view signal is a video sequence.

Clause 210. The method of any one of the clauses 201-209, where low-pass filtering of the first and/or the second image comprises filtering using one or more filters combined, the one or more filters combined having a cut-off frequency above ½ fs.

Clause 211. The method of any one of the clauses 201-210, further comprising a step of multiplexing the base-layer, the first enhancement-layer, the second enhancement layer, the first block-based displacement vectors and the second block-based displacement vectors into a bit-stream (BS).

Clause 212. The method of any one of the clauses 201-211, further comprising a step of broadcasting the bit-stream (BS).

Clause 213. The method of anyone of the clauses 201-212, wherein the up-scaling comprises upsampling followed by a low-pass filter.

Clause 214. The method of clause 213, wherein the low-pass filter for the up-scaling has a cut-off frequency above fs.

Clause 220. A bit-stream (BS) comprising an encoded image pair corresponding with two views of a multi-view signal:

a base-layer (LR-bas), the base-layer comprising an encoded first combined image (LeRo') being encoded using a first encoder, a first enhancement-layer (L-enh), the first enhancement-layer comprising a first encoded image (L') encoded using a first disparity based predictor (LpredD) and a first intermediate predictor (Lpred), the first intermediate predictor (LPred) based on up-scaling a first spatial half of the image information comprised in the base-layer (LeRo') and the first disparity based predictor (LpredD) based on the image information comprised in the base-layer (LeRo') and first block-based displacement vectors generated using disparity information present in the first and second images (L,R), the image information encoded in the base-layer (LeRo') and the first image (L), the first block-based displacement vectors, a second enhancement-layer (R-enh), the second enhancement-layer comprising an second encoded image (R') encoded using a second disparity based predictor (RpredD) and a second intermediate predictor (Rpred), the second intermediate predictor (LPred) based on up-scaling a second spatial half of the image information comprised in the base-layer (LeRo') and the first disparity based predictor (LpredD) based on the image information comprised in the base-layer (LeRo') and second block-based displacement vectors generated using disparity information present in the first and second images (L,R), the image information encoded in the base-layer (LeRo') and the second image (L) and the second block-based displacement vectors.

Clause 230. A method of decoding an image pair (L,R) corresponding with two views of a multi-view signal the method comprising:

generating a first decoded combined image (LeRo') by decoding a base-layer, up-scaling the respective spatial halves of the image information comprised in the base-layer (LeRo') to respectively form a first intermediate predictor (Lpred) and a second intermediate predictor (Rpred), both at full-resolution, generating a first and second disparity based predictor (LpredD, RpredD) for use in respectively encoding a first and a second enhancement layer (Lenh,Renh) and respectively associated first and second block-based displacement vectors (LHvec,RHvec) associated with the image information encoded in the base layer (LeRo'), the first and second block-based displacement vectors generated using disparity information present in the first and second images (L,R), the image information encoded in the base-layer (LeRo') and the respective first and second images (L,R), decoding a first enhancement-layer (L-enh) using the first disparity based predictor (LpredD) and first intermediate predictor (Lpred) forming a first reconstructed picture (L'), decoding a second enhancement layer (R-enh) using the second disparity based predictor (RpredD) and second intermediate predictor (Rpred) forming a second reconstructed picture (R').

Clause 231. The method according to clause 230, wherein the multi-view signal is a stereo signal.

Clause 232. The method according to clause 231, wherein:
the first decoded combined image (LeRo') is a side by side encoded image or
the first decoded combined image (LeRo') is a top-bottom encoded image.

Clause 233. The method of any one of the clauses 230-232, further comprising receiving a broadcasted bit-stream (BS).

Clause 234. The method of any one of the clauses 230-233, further comprising de-multiplexing a received bit-stream in order to obtain the base-layer, the first enhancement layer, the second enhancement layer, the first block-based displacement vectors (LHvec) and the second block-based displacement vectors (RHvec).

Clause 250. An encoder for encoding an image pair (L,R) corresponding with two views of a multi-view signal the method comprising:
a first generator for generating a first combined image (LeRo) based on a first low pass filtered version of a first image of the image pair and a first low-pass filtered version of the second image of the image pair, the first combined image (LeRo) comprising:
samples having a first parity from the first low-pass filtered version of the first image, the samples being spatially co-located in the first combined image and
samples having a second parity from the first low-pass filtered version of the second image, the samples being spatially co-located in the first combined image,
a first encoder for generating a base-layer (LR-bas) by encoding the first combined image (LeRo),
an upscaler for up-scaling the respective spatial halves of the image information comprised in the base-layer (LeRo') to respectively form a first intermediate predictor (Lpred) and a second intermediate predictor (Rpred), both at full-resolution,
a second generator of generating a first and second disparity based predictor (LpredD, RpredD) for use in respectively encoding a first and a second enhancement layer (Lenh,Renh) and respectively associated first and second block-based displacement vectors (LHvec,RHvec) associated with the image information encoded in the base layer (LeRo'), the first and second block-based displacement vectors generated using disparity information present in the first and second images (L,R), the image information encoded in the base-layer (LeRo') and the respective first and second images (L,R),
a second encoder generating a first enhancement-layer (L-enh) by encoding the first image (L) using the first disparity based predictor (LpredD) and first intermediate predictor (Lpred),
a third encoder for generating a second enhancement layer (R-enh) by encoding the second image (R) using the first disparity based predictor (RpredD) and first intermediate predictor (Rpred).

Clause 251. A decoder for decoding an image pair (L,R) corresponding with two views of a multi-view signal the method comprising:
a first decoder for generating a first decoded combined image (LeRo') by decoding a base-layer,
an upscaler for up-scaling the respective spatial halves of the image information comprised in the base-layer (LeRo') to respectively form a first intermediate predictor (Lpred) and a second intermediate predictor (Rpred), both at full-resolution,
a first generator for generating a first and second disparity based predictor (LpredD, RpredD) for use in respectively encoding a first and a second enhancement layer (Lenh,Renh) and respectively associated first and second block-based displacement vectors (LHvec,RHvec) associated with the image information encoded in the base layer (LeRo'), the first and second block-based displacement vectors generated using disparity information present in the first and second images (L,R), the image information encoded in the base-layer (LeRo') and the respective first and second images (L,R),
a second decoder for decoding a first enhancement-layer (L-enh) using the first disparity based predictor (LpredD) and first intermediate predictor (Lpred) forming a first reconstructed picture (L'),
a third decoder for decoding a second enhancement layer (R-enh) using the first disparity based predictor (RpredD) and first intermediate predictor (Rpred) forming a second reconstructed picture (R').

Clause 260. A computer program product on a computer readable medium, the product comprising instructions for executing at least one of the methods of clauses 201-214 or 230-234.

Clause 261. A software tool for executing at least one or more methods of clauses 201-214 or 230-234, wherein the software tool comprises instructions for executing the at least one or more methods.

Further Variants of the Present Invention

In the following, further variants of the present invention are described.

Variant 1

In accordance with a first variant of the invention, an encoding/decoding solution is provided which provides a saving with regard to the amount of processing and memory compared to the known prior art. Moreover as the encoding strongly resembles that of MVC, the solution also provides economy of scale compared to the known prior art. The scheme provides an approximation of full HD per eye in line with the known prior art.

This scheme addresses issue B.

Figure 6A:
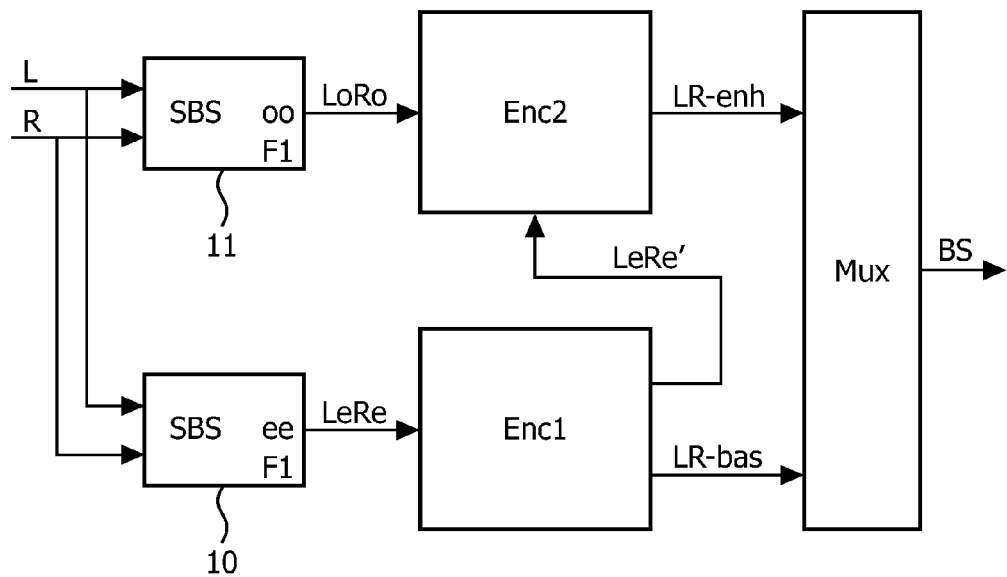

FIG. 6A illustrates an encoder system in accordance with the present variant. The encoding system comprises two encoding devices Enc1 and Enc2 for encoding the base-layer LR-bas and the enhancement-layer LR-enh respectively.

The base-layer encoder provides a frame-compatible combined image, which base-layer in combination with the enhancement layer allows an improved reconstruction of the encoded stereo images wherein the image quality approaches full HD.

In this respect it is noted that the first encoder Enc1 does not require to have a predictor input as the base-layer may be coded based on a first combined image LeRe only.

Figure 3:
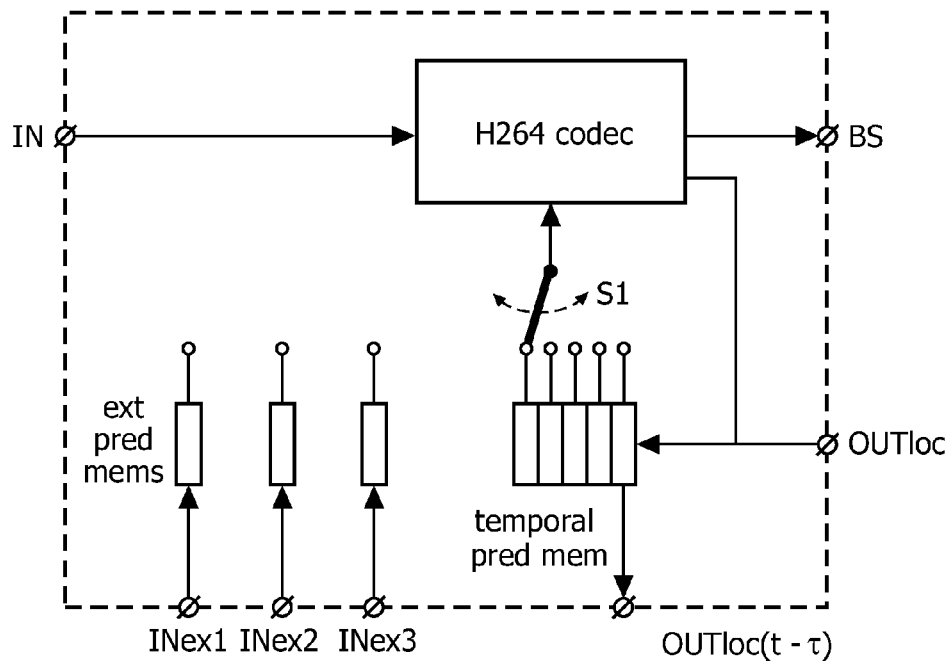
FIG. 3 shows an exemplary block diagram of a prior art MVC encoder/decoder.

However it is noted that in order to enable hardware re-use and or to simplify the coding architecture both encoders could be based on one and the same coder architecture as e.g. the encoder/decoder shown in FIG. 3 which corresponds with a standard MVC encoder, in this case having three possible external predictor inputs.

It is noted that by applying the invention in accordance with the first variant, the encoder effectively generates two frame compatible stereo signals; LeRe and LoRo. Here the decoded base signal, LeRe' is used directly as a predictor for the enhancement layer. In this manner a significant amount of processing and memory is saved compared to the known prior art.

As the encoder may be implemented using hardware that shows great similarity with MVC, the solution moreover has the advantages of economy of scale.

Although this scheme cannot reproduce true HD resolution image quality is comparable with that of the known prior art.

FIG. 6A shows a method of encoding an image pair L, R corresponding with two views of a multi-view signal.

The method comprises a step 10 of generating a first combined image LeRe based on a first low pass filtered version of a first image of the image pair and a first low-pass filtered version of the second image of the image pair, the first combined image LeRe comprising samples having a first parity from the first low-pass filtered version of the first image, the samples being spatially co-located in the first combined image and samples having a first parity from the first low-pass filtered version of the second image, the samples being spatially co-located in the first combined image.

The method further comprises a step 11 of generating a second combined image LoRo based on a second low pass filtered version of the first image of the image pair and a second low-pass filtered version of the second image of the image pair, the second combined image LoRo comprising samples having second parity from the second low-pass filtered version of the first image the samples being spatially co-located in the second combined image and samples having second parity from the second low-pass filtered version of the second image the samples being spatially co-located in the second combined image.

The method also comprises a step of generating a base-layer LR-bas by encoding the first combined image LeRe and subsequently generating an enhancement-layer LR-enh by encoding the second combined image LoRo using information encoded in the base-layer as a predictor input in the encoding.

As shown in FIG. 6A, the image information as encoded in the base-layer LeRe' is used as predictor input for generating the enhancement layer. It is important to realize that LeRe' will be available also on the decoder side after having decoded the base-layer information. Consequently the information comprised in the encoded base-layer may be used directly as a predictor for the enhancement layer although as will be shown below, it may also be processed further prior to being used as a predictor.

As at present a variety of encoding standards are available it may also be possible to create a hybrid encoder. For example the base-layer may be encoded using e.g. one of an MPEG-2, an AVC, or a HVC encoding scheme as known to those skilled in the art of video compression. In turn the enhancement-layer encoder may be chosen to use e.g. one of an AVC, or HVC encoding scheme.

As will be clear from the above, preferably the multi-view signal is a stereo signal and more preferably the combined images as either side-by-side encoded images or top-bottom encoded images. This way the variant provides backwards compatibility with existing frame compatible formats.

When using a side-by-side or top-bottom encoding for the combined images then the spatially co-located samples having the first parity correspond with a first half of the combined images and wherein the spatially co-located samples having the second parity correspond with a second half of the combined images.

Although the present variant may be applied to still image, it preferably is used for video sequences.

The generation of the second combined image LoRo, i.e. reference sign 11) as shown in FIG. 6A corresponds with the generation of a combined image as described hereinabove with reference to FIG. 1A.

Although as described herein above the generation of the first and second combined image LeRe and LoRo may be implemented independently, it is possible to combine these operations, as both involve the application of a low-pass filter F1. As shown in FIG. 1A this filter F1 may be the same for both images, consequently combining the blocks 10 and 11 may result in a design having a smaller design foot-print.

The low-pass filter F1 as indicated in FIG. 1A may comprise one or more filters which combined have a have a cut-off frequency above ½ fs. As a result the filter will allow some aliasing to occur, however it does enable a higher quality image when combining the base-layer and the enhancement-layer.

As indicated in FIG. 6A, preferably the method of encoding also comprises a step of multiplexing the base-layer and enhancement-layer into a bit-stream (BS). Finally the method of encoding may also comprise a step of broadcasting, storing and/or transmitting the bit-stream (BS).

The resulting bit-stream BS comprises an encoded image pair corresponding with two views of a multi-view signal. The bit-stream comprises a base-layer LR-bas, the base-layer comprising an encoded first combined image LeRe' being encoded using a first encoder. The bit-stream further comprises an enhancement-layer LR-enh, the enhancement-layer comprising an encoded second combined image LoRo' being encoded using a second encoder and using a predictor input based on the decoded encoded first combined image LeRe'.

The encoded first combined image LeRe' in turn is based on a first combined image LeRe, the first combined image LeRe based on a first low pass filtered version of a first image of an original image pair and a first low-pass filtered version of a second image of the original image pair.

The first combined image LeRe in turn comprises samples having a first parity from the first low-pass filtered version of the first image, the samples being spatially co-located in the encoded first combined image and samples having a first parity from the first low-pass filtered version of the second image, the samples being spatially co-located in the encoded first combined image.

The encoded second combined image LoRo' is based on a second combined image LoRo, the second combined image LoRo based on a second low pass filtered version of the first image of the original image pair and a second low-pass filtered version of the second image of the original image pair.

The second combined image LoRo in turn comprises samples having second parity from the second low-pass filtered version of the first image the samples being spatially co-located in the second combined image and samples having second parity from the second low-pass filtered version of the second image the samples being spatially co-located in the second combined image.

Figure 6B:
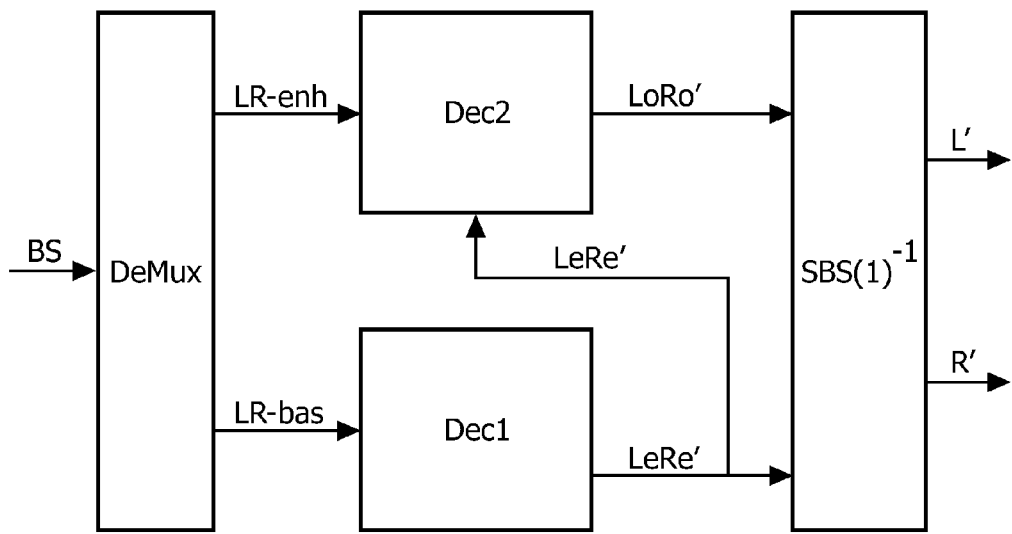
FIG. 6B shows a block diagram of a decoder in accordance with the present invention.

FIG. 6B shows a decoder according to the present variant, the decoder arranged to execute a method of decoding an image pair corresponding with two views of a multi-view signal.

The decoder shown includes a de-multiplexer for de-multiplexing a received bit-stream (BS), this bit-stream may have been received from either a storage medium or a wired or wireless network. The de-multiplexer de-multiplexes the received bit-stream in order to obtain a base-layer LR-bas and the enhancement layer LE-enh.

In order to reconstruct a first and second reconstructed image L' and R' respectively, the decoder conducts a method of decoding an image pair corresponding with two views of a multi-view signal. To this end a first decoded combined image LeRe' is generated by decoding the base-layer. Subsequently a second decoded combined image LoRo' is generated by decoding an enhancement layer using the first decoded image as a predictor.

Like discussed hereinabove the decoder systems may be chosen so as to utilize the same or a different decoding algorithm, as long as they mirror the encoder side.

Next the first and second reconstructed images are reconstructed. In case of the first reconstructed image L' this involves using spatially co-located samples in the first decoded combined image LeRe' as samples having a first parity in the first reconstructed image L' and using spatially co-located samples in the second decoded combined image LoRo' as samples having a second parity in the first reconstructed image L', thereby forming the first reconstructed image L'.

Analogously reconstructing the second reconstructed image R' involves using further spatially co-located samples in the first decoded combined image LeRe' as samples having a first parity in the second reconstructed image R' and using further spatially co-located samples in the second decoded combined image LoRo' as samples having a second parity in the second reconstructed image R', thereby forming the second reconstructed image.

The above corresponds with the image reconstruction process as discussed earlier on with reference to FIG. 1B.

In a preferred embodiment the samples having the first parity in the first reconstructed image L' are formed by a first spatial half of the first decoded combined image LeRe' and the samples having the second parity in the first reconstructed image L' are formed by a second spatial half of the second decoded combined image LoRo'. Likewise the samples having the first parity in the second reconstructed image R' are formed by a second spatial half of the first decoded combined image LeRe' and the samples having the second parity in the second reconstructed image R' are formed by a second spatial half of the second decoded combined image LoRo'.

More preferably the first and second decoded combined images LeRe', LoRo' are side-by-side encoded images or the first and second decoded combined images LeRe', LoRo' are top-bottom encoded images.

Variant 2

In accordance with a second variant of the invention, an encoding/decoding solution is provided which provides a saving with regard to the amount of processing and memory compared to the known prior art. Moreover as the encoding strongly resembles that of MVC, the solution also provides economy of scale compared to the known prior art. The scheme provides an approximation of full HD per eye in line with the known prior art. Moreover the scheme enables the generation of an improved frame compatible image (see details below).

This scheme addresses the issues B, D and F.

As indicated herein above with reference to FIG. 7A, it is possible to encode an enhancement layer and use the image information as encoded in the base-layer as predictor for the enhancement layer. However, it is possible to further encode information derivable from the original left and right image of the image pair and the image information encoded in the base-layer, provided that this additional information is also made available at the decoder side.

However in order to preserve coding efficiency the amount of data that may be included should be kept to a minimum. According to a further aspect of the variant, additional information may be provided in the bit-stream in the form of filter coefficients for use in generating a predictor based on both the image information provided in the encoded base-layer and the image information from the first image L and/or second image R.

As the first image L and the second image R are not available on the decoder side, these images may be used to encode information that allows the decoder to e.g. improve the quality of the predictor image for the encoding of the enhancement layer.

In a preferred embodiment, the first image L and the second image R are used to configure a filter for adapting the predictor for use in encoding the enhancement layer. As will be clear to those skilled in the art, this adapted predictor may be used instead of the original predictor or as a further predictor input for the encoding of the enhancement layer.

More preferably the first image L and the second image R are used to configure one or more up-scaling filters (e.g. one for the left image and one for the second image) in order to generate a full-resolution predictor for both the first and the second image. These full-resolution predictors may in turn be packed in to an alternative combined predictor which can be used as an alternative for, or in addition to, the image information as encoded in the base-layer.

Figure 7A:
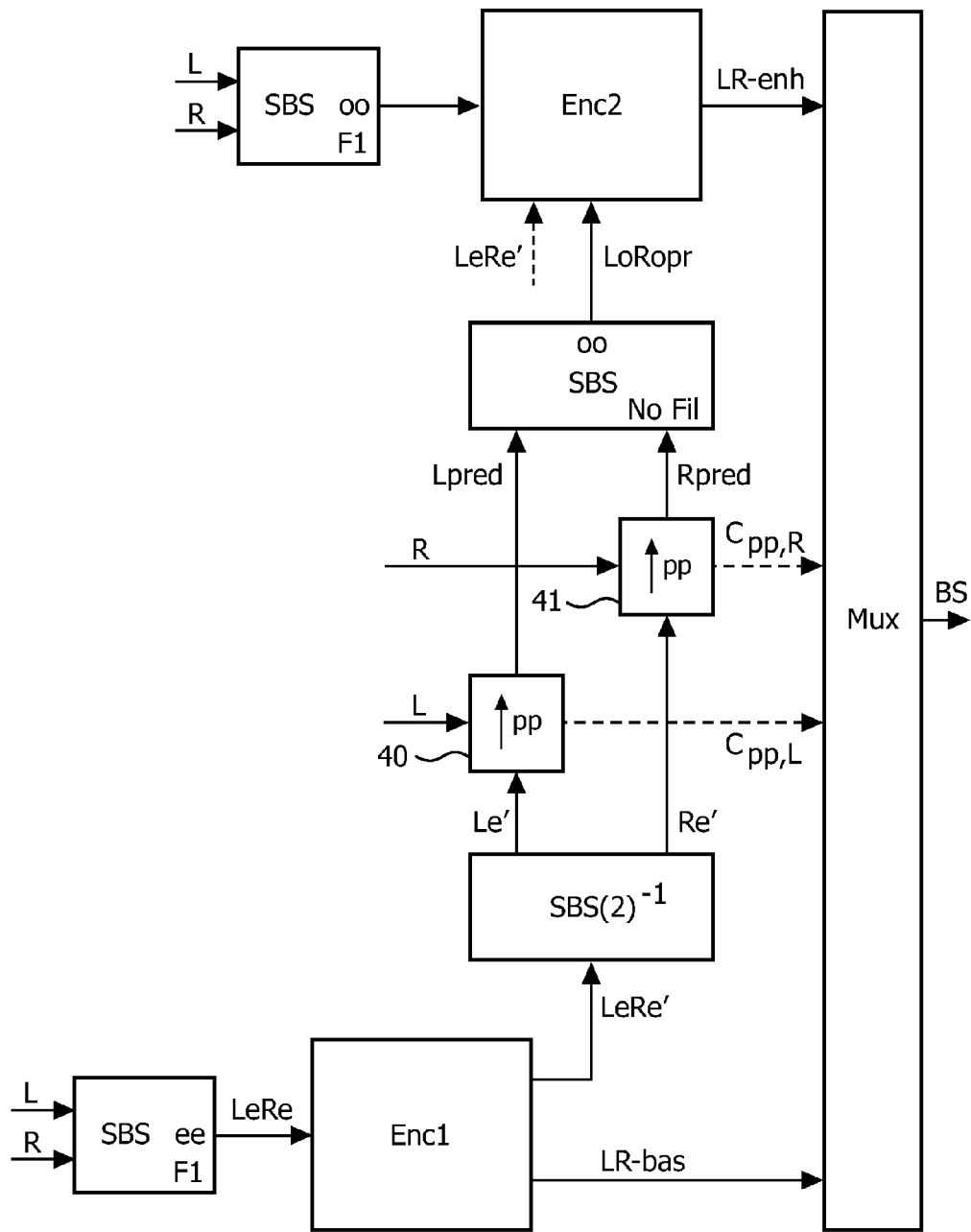
FIG. 7A shows a block diagram of an encoder in accordance with the present invention.

An example encoder system which includes adapting a predictor based on the first and second images L, R is provided in FIG. 7A. FIG. 7A has substantial overlap with FIG. 6A and consequently the focus will be directed primarily to the generation of an additional combined predictor image for encoding the enhancement layer LB-enh.

After having encoded the base-layer LR-bas, the image information as encoded in the base-layer LR-bas is available for generating a further predictor. In this embodiment the image information as encoded in the base-layer is used directly as predictor input for the encoding of the enhancement layer as well as for generating a third full resolution predictor input (i.e. the combined predictor input) for generating the enhancement layer.

After encoding the image information in the decoded combined image LeRe', the image information intended for reconstruction of the left image and image information intended for reconstruction of the right image are "disentangled"; i.e. the spatially co-located samples intended for reconstruction of the first reconstructed image Le' are separated from the spatially co-located samples intended for reconstruction of the second reconstructed image Re', using the SBS(2)$^{-1}$ operation. The respective outputs correspond to two half resolution image which are subsequently up-scaled using an image dependent upscaler that uses Le' and Re' respectively in combination with the first image L and the second image R, to configure the up-scaling filters 40 and 40 respectively.

The image adaptive up-scaling determines coefficients in order to configure the image adaptive upscaler; e.g. by classifying the images in its entirety or on a lower level; e.g. on the block level and using an upscaler tuned to the particular classification. The resulting filter coefficients or parameters will have to be encoded in the resulting bit-stream in order to enable a corresponding decoder to perform the same up-scaling as used during the encoding.

An example of a scheme involving post-processing involving such a classification process is presented in International Patent Application WO2008/075247 titled "IMAGE COMPRESSION AND DECOMPRESSION" by the same applicant, hereby incorporated by reference. Use of this type of processing for this particular application provides two advantages: it improves the quality of the prediction and therefore may lower the bit-rate of the enhancement layer, but in addition it provides information which allows improvements to the base-layer image without the need to decode the enhancement layer. This may e.g. be a solution for applications where decoding the enhancement layer is too costly, i.e. resource-wise or processing-wise.

Thus this particular manner of encoding also allows a form of scalability for resource limited applications.

The output of the respective upscalers corresponds to a first full-resolution predictor Lpred and second full-resolution predictor Rpred. Subsequently the first and second full-resolution predictors are combined using an SBS operation as described with reference to FIG. 1A resulting in the third full resolution predictor LoRopr, such that the third full-resolution predictor LoRopr comprises samples having second parity from the first full-resolution predictor of the first image, the samples being spatially co-located in the third full-resolution predictor and samples having second parity from the second full-resolution predictor of the second image, the samples being spatially co-located in the third full-resolution predictor.

It is important to note that the SBS operation as shown in FIG. 7A does not include a low-pass filter as was present in the embodiment shown in FIG. 1A. Instead the SBS operation as shown in FIG. 7A only decimates/downsamples the incoming full-resolution predictor images.

As indicated herein above the up-scaling filters 40, 41 may be parameterizable image adaptive up-scaling filters (optional), wherein the coefficients and/or parameters for configuring the image adaptive up-scaling filters Cpp,L and Cpp,R are to be included in the encoded bit-stream.

To this end the encoding system as presented in FIG. 7A comprises a multiplexer for multiplexing the base-layer, the enhancement-layer, and the respective parameters for the image-adaptive up-scaling filters into the bit-stream BS.

The resulting bit-stream BS thus comprises in addition to the BS as described hereinabove with reference to the FIGS. 6A and 6B, the encoded parameters for use in image adaptive up-scaling of image information as intended for reconstruction of the first image as encoded in the base-layer LR-bas to a first full-resolution predictor Lpred and image adaptive up-scaling of image information as intended for reconstruction of the second image as encoded in the base-layer LR-bas to a second full-resolution predictor Rpred.

Figure 7B:
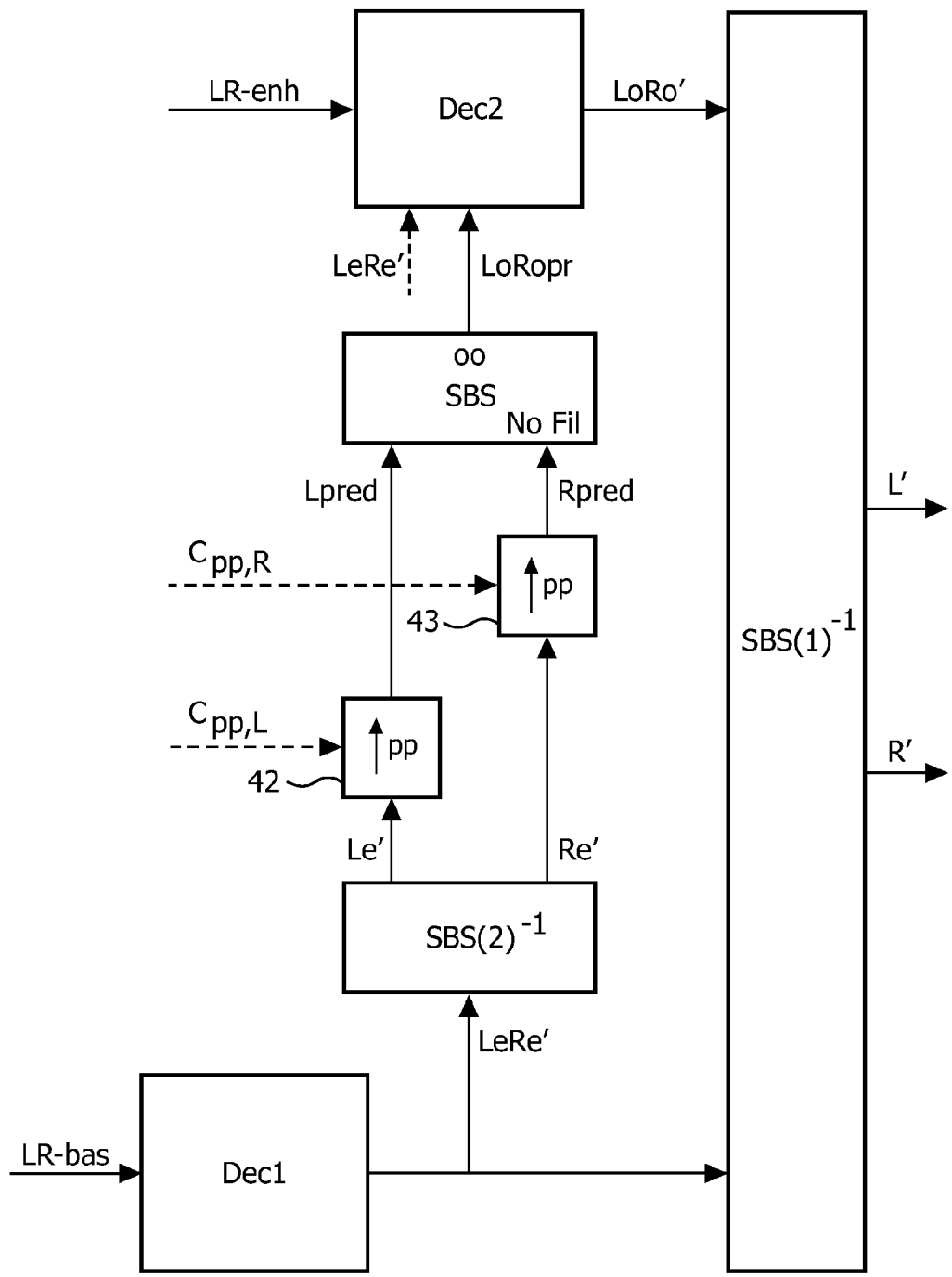
FIG. 7B shows a block diagram of a decoder in accordance with the present invention.

FIG. 7B shows a decoder system for use in decoding an image pair corresponding with two views of a multi-view signal for use in decoding a bit-stream comprising the information as provided in FIG. 7A. For the sake of clarity the bit-stream de-multiplexer has not been included. This de-multiplexer demultiplexes the received bit-stream (not shown) into a base-layer, an enhancement layer and optional coefficients and/or parameters Cpp,L and Cpp,R for configuring the image adaptive up-scaling filters 42 and 43 respectively.

Using these up-scaling filter 42 and 43, the decoder can construct a first and second full-resolution predictors (Lpred, Rpred), which in turn may be combined into a full-resolution third predictor (LoRopr) by means of an SBS operation without low-pass filter as was described with reference to FIG. 7A.

Further Embodiments of Variant 1 and Variant 2

Further embodiments of the first variant and the second variant can be described in reference to the following clauses.

In accordance with the first variant of the present invention, an encoder, a decoder, a method of encoding, a method of decoding an image pair corresponding with two views of a multi-view signal is provided as well as a bit-stream representing two views of a multi-view signal, a computer program product and a software tool for executing the methods according to the present invention are provided in the clauses 1-13, 20, 30-36, 50, 53, and 60 and 61 as far as dependent on the previous clauses.

In accordance with the second variant of the present invention, an encoder, a decoder, a method of encoding, a method of decoding an image pair corresponding with two views of a multi-view signal is provided as well as a bit-stream representing two views of a multi-view signal, a computer program product and a software tool for executing the methods according to the present invention are provided in the clauses 14-18, 21, 37-41, 51-52, 54-55, and 60 and 61 as far as dependent on the previous clauses.

Clause 1. A method of encoding an image pair (L,R) corresponding with two views of a multi-view signal the method comprising:
   generating a first combined image (LeRe) based on a first low pass filtered version of a first image of the image pair and a first low-pass filtered version of the second image of the image pair, the first combined image (LeRe) comprising:
      samples having a first parity from the first low-pass filtered version of the first image, the samples being spatially co-located in the first combined image and
      samples having a first parity from the first low-pass filtered version of the second image, the samples being spatially co-located in the first combined image,
   generating a second combined image (LoRo) based on a second low pass filtered version of the first image of the image pair and a second low-pass filtered version of the second image of the image pair, the second combined image (LoRo) comprising:
      samples having second parity from the second low-pass filtered version of the first image the samples being spatially co-located in the second combined image and
      samples having second parity from the second low-pass filtered version of the second image the samples being spatially co-located in the second combined image,
   generating a base-layer (LR-bas) by encoding the first combined image (LeRe) and
   generating an enhancement-layer (LR-enh) by encoding the second combined image (LoRo) using information encoded in the base-layer as a predictor input in the encoding.

Clause 2. The method of clause 1, wherein the image information as encoded in the base-layer is used as predictor input for generating the enhancement layer.

Clause 3. The method of any one of the preceding clauses, wherein the base-layer is encoded using one of:
   an MPEG-2 encoding
   an AVC encoding and
   an HVC encoding.

Clause 4. The method of any one of the preceding clauses, wherein the enhancement-layer is encoded using one of:
   an AVC encoding and
   an HVC encoding.

Clause 5. The method of any one of the preceding clauses, wherein the multi-view signal is a stereo signal.

Clause 6. The method of clause 5, wherein the combined images are encoded as one of:
   side-by-side encoded images or
   top-bottom encoded images.

Clause 7. The method of clause 6, wherein the spatially co-located samples having the first parity correspond with a first half of the combined images and wherein the spatially co-located samples having the second parity correspond with a second half of the combined images.

Clause 8. The method of any one of the preceding clauses, wherein the multi-view signal is a video sequence.

Clause 9. The method of any one of the preceding clauses, wherein the first low pass filtered version of the first image and the second low pass filtered version of the first image are one and the same image.

Clause 10. The method of any one of the preceding clauses, wherein the first low pass filtered version of the second image and the second low pass filtered version of the second image are one and the same image.

Clause 11. The method of any one of the preceding clauses, where low-pass filtering of the first and/or the second image comprises filtering using one or more filters combined, the one or more filters combined having a cut-off frequency above ½ fs.

Clause 12. The method of any one of the preceding clauses, further comprising a step of multiplexing the base-layer and enhancement-layer into a bit-stream (BS).

Clause 13. The method of any one of the preceding clauses, further comprising a step of broadcasting the bit-stream (BS).

Clause 14. The method of clause 1, wherein the image information as encoded in the base-layer is filtered prior to being used as the predictor input for generating the enhancement layer.

Clause 15. The method of clause 14, comprising:
    image adaptive up-scaling of image information as intended for reconstruction of the first image as encoded in the base-layer (LR-bas) to a first full-resolution predictor and
    image adaptive up-scaling of image information as intended for reconstruction of the second image as encoded in the base-layer (LR-bas) to a second full-resolution predictor.

Clause 16. The method of clause 15, further comprising:
    combining the first full-resolution predictor (Lpred) and the second full-resolution predictor (Rpred) into a third full-resolution predictor (LoRopr), the third full-resolution predictor (LoRopr) comprising:
        samples having second parity from the first full-resolution predictor of the first image, the samples being spatially co-located in the third full-resolution predictor and
        samples having second parity from the second full-resolution predictor of the second image, the samples being spatially co-located in the third full-resolution predictor.

Clause 17. The method of any one of clauses 15-16, wherein the up-scaling utilizes one or more parameterizable image adaptive up-scaling filters.

Clause 18. The method of clause 17, further comprising a step of multiplexing the base-layer and enhancement-layer, and the respective parameters for the image-adaptive up-scaling filters into a bit-stream (BS).

Clause 20. A bit-stream (BS) comprising an encoded image pair corresponding with two views of a multi-view signal, the bit-stream comprising:
    a base-layer (LR-bas), the base-layer comprising an encoded first combined image (LeRe') being encoded using a first encoder,
    an enhancement-layer (LR-enh), the enhancement-layer comprising an encoded second combined image (LoRo') being encoded using a second encoder and using a predictor input based on the decoded encoded first combined image (LeRe'), wherein
        the encoded first combined image (LeRe') based on a first combined image (LeRe), the first combined image (LeRe) based on a first low pass filtered version of a first image of an original image pair and a first low-pass filtered version of a second image of the original image pair, the first combined image (LeRe) comprising:
            samples having a first parity from the first low-pass filtered version of the first image, the samples being spatially co-located in the encoded first combined image and
            samples having a first parity from the first low-pass filtered version of the second image, the samples being spatially co-located in the encoded first combined image,
        the encoded second combined image (LoRo') based on a second combined image (LoRo), the second combined image (LoRo) based on a second low pass filtered version of the first image of the original image pair and a second low-pass filtered version of the second image of the original image pair, the second combined image (LoRo) comprising:
            samples having second parity from the second low-pass filtered version of the first image the samples being spatially co-located in the second combined image and
            samples having second parity from the second low-pass filtered version of the second image the samples being spatially co-located in the second combined image.

Clause 21. The bit-stream (BS) according to clause 20, further comprising parameters for the generation of the predictor input, the encoded parameters for use in:
    image adaptive up-scaling of image information as intended for reconstruction of the first image as encoded in the base-layer (LR-bas) to a first full-resolution predictor (Lpred) and
    image adaptive up-scaling of image information as intended for reconstruction of the second image as encoded in the base-layer (LR-bas) to a second full-resolution predictor (Rpred).

Clause 30. A method of decoding an image pair corresponding with two views of a multi-view signal the method comprising:
    generating a first decoded combined image (LeRe') by decoding a base-layer,
    generating a second decoded combined image (LoRo') by decoding an enhancement layer using the first decoded image as a predictor,
    reconstructing a first reconstructed image (L')
    using spatially co-located samples in the first decoded combined image (LeRe') as samples having a first parity in the first reconstructed image (L') and
    using spatially co-located samples in the second decoded combined image (LoRo') as samples having a second parity in the first reconstructed image (L'), thereby forming the first reconstructed image (L'), and
    reconstructing a second reconstructed image (R')
    using further spatially co-located samples in the first decoded combined image (LeRe') as samples having a first parity in the second reconstructed image (R') and
    using further spatially co-located samples in the second decoded combined image (LoRo') as samples having a second parity in the second reconstructed image (R'), thereby forming the second reconstructed image.

Clause 31. The method according to clause 30, wherein:
    the samples having the first parity in the first reconstructed image (L') are formed by a first spatial half of the first decoded combined image (LeRe') and
    the samples having the second parity in the first reconstructed image (L') are formed by a second spatial half of the second decoded combined image (LoRo').

Clause 32. The method according to clause 31, wherein:
    the samples having the first parity in the second reconstructed image (R') are formed by a second spatial half of the first decoded combined image (LeRe') and
    the samples having the second parity in the second reconstructed image (R') are formed by a second spatial half of the second decoded combined image (LoRo').

Clause 33. The method according to any one of clauses 30-32, wherein the multi-view signal is a stereo signal.

Clause 34. The method according to clause 33, wherein:
the first and second decoded combined images (LeRe', LoRo') are side by side encoded images or
the first and second decoded combined images (LeRe', LoRo') are top-bottom encoded images.

Clause 35. The method of any one of the clauses 30-34, further comprising receiving a broadcasted bit-stream (BS).

Clause 36. The method of any one of the clauses 30-35, further comprising de-multiplexing a received bit-stream in order to obtain the base-layer and the enhancement layer.

Clause 37. The method of any one of the clauses 30-36, wherein the image information as encoded in the base-layer is decoded and filtered prior to being used as the predictor input for decoding the enhancement layer.

Clause 38. The method of clause 37, comprising:
image adaptive up-scaling of image information as intended for reconstruction of the first image as encoded in the base-layer (LR-bas) to a first full-resolution predictor (Lpred) and
image adaptive up-scaling of image information as intended for reconstruction of the second image as encoded in the base-layer (LR-bas) to a second full-resolution predictor (Lpred).

Clause 39. The method of clause 38, comprising:
combining the first full-resolution predictor (Lpred) and the second full-resolution predictor (Rpred) into a third full-resolution predictor (LoRopr), the third full-resolution predictor (LoRopr) comprising:
samples having second parity from the first full-resolution predictor (Lpred) of the first image, the samples being spatially co-located in the third full-resolution predictor and
samples having second parity from the second full-resolution predictor (Rpred) of the second image, the samples being spatially co-located in the third full-resolution predictor.

Clause 40. The method of any one of clauses 38-39, wherein the up-scaling utilizes one or more parameterizable image adaptive up-scaling filters.

Clause 41. The method of clause 40, further comprising a step of obtaining the base-layer and enhancement-layer, and the respective parameters for the image-adaptive up-scaling filters from a bit-stream (BS).

Clause 50. An encoder for encoding an image pair (L,R) corresponding with two views of a multi-view signal the method comprising:
a first generator for generating a first combined image (LeRe) based on a first low pass filtered version of a first image of the image pair and a first low-pass filtered version of the second image of the image pair, the first combined image (LeRe) comprising:
samples having a first parity from the first low-pass filtered version of the first image, the samples being spatially co-located in the first combined image and
samples having a first parity from the first low-pass filtered version of the second image, the samples being spatially co-located in the first combined image,
a second generator for generating a second combined image (LoRo) based on a second low pass filtered version of the first image of the image pair and a second low-pass filtered version of the second image of the image pair, the second combined image (LoRo) comprising:
samples having second parity from the second low-pass filtered version of the first image the samples being spatially co-located in the second combined image and
samples having second parity from the second low-pass filtered version of the second image the samples being spatially co-located in the second combined image,
a first encoder (Enc1) for generating a base-layer (LR-bas) by encoding the first combined image (LeRe) and
a second encoder (Enc2) for generating an enhancement-layer (LR-enh) by encoding the second combined image (LoRo) using information encoded in the base-layer as a predictor input in the encoding.

Clause 51. The encoder of clause 50, further comprising a filter arranged to filter the image information as encoded in the base-layer prior to being used as the predictor input for generating the enhancement layer.

Clause 52. The encoder of clause 51, further comprising:
a first image adaptive upscaler arranged to upscale image information as intended for reconstruction of the first image as encoded in the base-layer (LR-bas) to a first full-resolution predictor (Lpred) and
a second image adaptive upscaler arranged to upscale image information as intended for reconstruction of the second image as encoded in the base-layer (LR-bas) to a second full-resolution predictor (Rpred).

Clause 53. A decoder for decoding an image pair corresponding with two views of a multi-view signal the method comprising:
a first decoder for generating a first decoded combined image (LeRe') by decoding a base-layer,
a second decoder for generating a second decoded combined image (LoRo') by decoding an enhancement layer using the first decoded image as a predictor,
a first image reconstructor arranged to
use spatially co-located samples in the first decoded combined image (LeRe') as samples having a first parity in the first reconstructed image (L') and
use spatially co-located samples in the second decoded combined image (LoRo') as samples having a second parity in the first reconstructed image (L'), thereby forming the first reconstructed image (L'), and
a second image reconstructor arranged to:
use further spatially co-located samples in the first decoded combined image (LeRe') as samples having a first parity in the second reconstructed image (R') and
use further spatially co-located samples in the second decoded combined image (LoRo') as samples having a second parity in the second reconstructed image (R'), thereby forming the second reconstructed image.

Clause 54. The decoder of clause 53, further comprising a filter arranged to filter the image information as encoded in the base-layer after decoding, prior to being used as the predictor input for generating the enhancement layer.

Clause 55. The decoder of clause 54, further comprising:
a first image adaptive upscaler for up-scaling image information as intended for reconstruction of the first image as encoded in the base-layer (LR-bas) to a first full-resolution predictor (Lpred) and
a second image adaptive upscaler for up-scaling image information as intended for reconstruction of the second image as encoded in the base-layer (LR-bas) to a second full-resolution predictor (Lpred).

Clause 60. A computer program product on a computer readable medium, the product comprising instructions for executing at least one of the methods of clauses 1-18 or 30-41.

Clause 61. A software tool for executing at least one or more methods of clauses 1-18 or 30-41, wherein the software tool comprises instructions for executing the at least one or more methods.

Variant 3

In accordance with a third variant of the present invention, a encoder/decoder, method of encoding and decoding are provided for an image pair L,R corresponding with two views of a multi-view signal, which enable an improved frame compatible image compared to the known prior art and at the same time also enables full HD per eye.

This scheme addresses issues A, D, F and G.

In accordance with this third variant, a base-layer and two enhancement-layers are encoded. It is important to note that in accordance with the third variant the image quality for frame compatible stereoscopic devices is not compromised; i.e. the base-layer is properly filtered upon down-scaling the first and second image, so as to prevent aliasing in the combined frame compatible format.

In accordance with the third variant this filtering is no longer required for approximating full HD per eye. Instead, by encoding two enhancement layers; one for samples having even, one for samples having odd parity and reducing the amount of filtering present in the path for generating the enhancement layers, full HD may be provided for both eyes.

Figure 8:
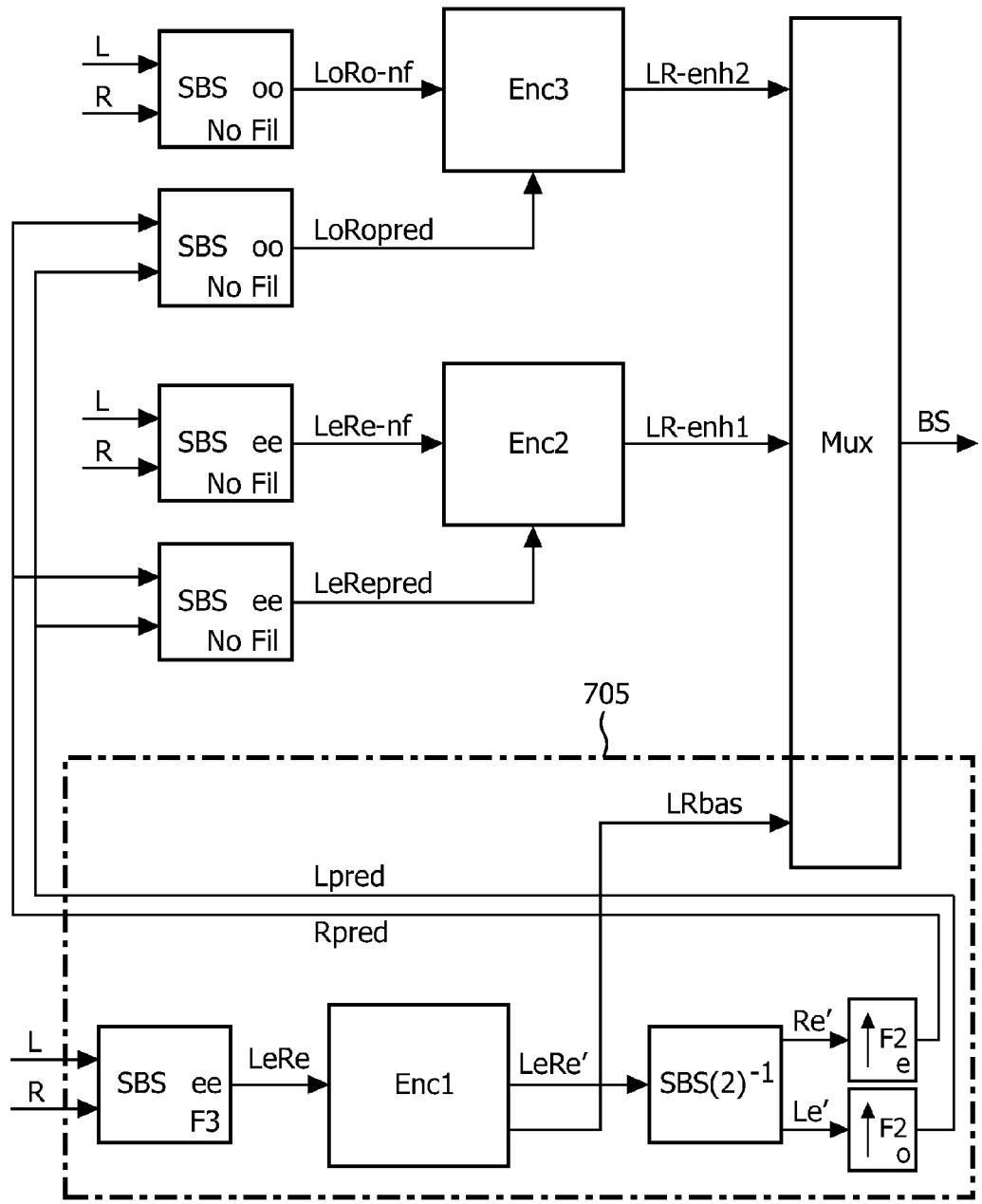
FIG. 8 shows a block diagram of an encoder in accordance with the present invention.

FIG. 8 shows an encoding system in accordance with the third variant of the invention. The encoding system is arranged for executing a method of encoding an image pair L,R corresponding with two views of a multi-view signal.

The method comprises generating a first combined image LeRe based on a first low pass filtered version of a first image of the image pair and a first low-pass filtered version of the second image of the image pair. As indicated by the "F3" attribute on the SBS block, the generation of the first combined image LeRe involves applying a low-pass filter prior to down-sampling.

Although it is noted that it is possible to use a weaker filter, i.e. a filter with a cut-off frequency above ½ fs, it is preferred to use a filter having a cut-off frequency of ½ fs so as to prevent aliasing. As a result the best possible quality may be obtained for stereoscopic display devices as currently being deployed, i.e. frame compatible devices.

The first combined image LeRe comprises samples having a first parity from the first low-pass filtered version of the first image, the samples being spatially co-located in the first combined image and samples having a first parity from the first low-pass filtered version of the second image, the samples being spatially co-located in the first combined image.

The method further comprises generating a base-layer LR-bas by encoding the first combined image LeRe. The image information encoded in the base-layer (LR-bas) is subsequently used to generate to full-resolution predictors, Lpred and Rpred. These two predictors are formed by up-scaling the respective spatial halves of the image information comprised in the base-layer LeRe' thus resulting in a first intermediate predictor Lpred and a second intermediate predictor Rpred, both at full-resolution.

As indicated using the attribute "F2" on the respective upscalers, the up-scaling filters involve upsampling followed by a low-pass filter. It is noted that the upscaler preferably takes into account the parity of the input when up-scaling.

The two intermediate predictors are subsequently used to generate two further full-resolution predictors, one for encoding each enhancement layer. However in order to encode these enhancement layers we also need to generate two further combined images LoRo-nf and LeRe-nf.

To this end the encoding system further comprises means for generating a second combined image LeRe-nf, the second combined image LeRe-nf comprising samples having first parity of the first image, the samples being spatially co-located in the second combined image and samples having first parity from the second image the samples being spatially co-located in the second combined image. As indicated by the "nofil" attribute on the SBS operators the generation of the second combined image does not involve a low-pass filter.

In addition a third combined image is generated LoRo-nf, the third combined image LoRo-nf comprises samples having second parity of the first image, the samples being spatially co-located in the third combined image and samples having second parity from the second image the samples being spatially co-located in the third combined image. As indicated by the "nofil" attribute on the SBS operators the generation of the third combined image does not involve a low-pass filter.

In order to encode the second and third combined images in an efficient manner the intermediate predictors are used to form a first full resolution predictor LeRepred for use in generating the first enhancement layer LR-enh1 based on the first and second intermediate predictors Lpred, Rpred. In this case as indicated by the "nofil" attribute the downscaling using the SBS operator does not involve filtering. In case of the first full resolution predictor LeRepred the samples with first parity are used.

Likewise the two full resolution intermediate predictors are used to generate a second full resolution predictor LoRopred for use in generating the second enhancement layer LR-enh2 based on the first and second intermediate predictors Lpred, Rpred. In this case as indicated by the "nofil" attribute the downscaling using the SBS operator does not involve filtering. In case of the second full resolution predictor LoRopred the samples with second parity are used.

Next the first enhancement-layer LR-enh1 is generated by encoding the second combined image LeRe-nf using the first full resolution predictor LeRepred and the second enhancement-layer LR-enh2 is generated by encoding the third combined image LoRo-nf using the second full resolution predictor LoRopred.

Preferably the first full resolution predictor comprises samples having first parity of the first intermediate predictor Lpred, the samples being spatially co-located in the first full resolution predictor LeRepred, and samples having first parity of the second intermediate predictor Rpred, the samples being spatially co-located in the first full resolution predictor LeRepred.

Preferably the second full resolution predictor LoRopred comprises samples having second parity of the first intermediate predictor Lpred, the samples being spatially co-located in the second full resolution predictor LoRopred, and samples having second parity of the second intermediate predictor Rpred, the samples being spatially co-located in the second full resolution predictor LoRopred.

Preferably the base-layer is encoded using an MPEG-2 encoding scheme, an AVC encoding scheme or a HVC encoding scheme. Preferably the respective enhancement-layers are respectively encoded using an AVC encoding scheme or an HVC encoding scheme. It will be clear to those skilled in the art that in order to preserve the same image characteristics the first and second enhancement layers are preferably encoded using the same encoding scheme.

Depending on the type of encoding scheme used for encoding the respective enhancement layers it may be possible to add further predictors for encoding the respective enhancement layers.

For example for encoding the first enhancement layer LR-enh1, it may be possible to use the third combined signal LoRo-nf as a further predictor, or even the image information as encoded in the base layer LeRe'. Optionally it may also be possible to use the image information encoded in the second enhancement layer from an earlier time-instance as a further predictor. Analogously further predictors may be added to further improve encoding of the second enhancement layer LR-enh2

Preferably the multi-view signal is a stereo signal. More preferably the combined images are encoded as side-by-side encoded images or top-bottom encoded images. Even more preferably the spatially co-located samples having the first parity correspond with a first half of the combined images and wherein the spatially co-located samples having the second parity correspond with a second half of the combined images.

Preferably the multi-view signal is a video sequence.

Preferably the first low pass filtered version of the first image and the second low pass filtered version of the first image are one and the same image and the first low pass filtered version of the second image and the second low pass filtered version of the second image are one and the same image. More preferably, the low-pass filtering of the first and/or the second image comprises filtering using one or more filters combined, the one or more filters combined having a cut-off frequency of ½ fs.

Optionally the method further comprises a step of multiplexing the base-layer, the first enhancement-layer and the second enhancement-layer into a bit-stream BS. More optionally, the method further comprises a step of broadcasting the bit-stream BS.

The thus resulting bit-stream BS comprises an encoded image pair corresponding with two views of a multi-view signal. These two views are encoded using a base-layer LR-bas, the base-layer comprising an encoded first combined image LeRe' being encoded using a first encoder.

In addition the bitstream comprises two enhancement layers. A enhancement-layer LR-enh1, the first enhancement-layer comprising an encoded second combined image LeRe-nf' being encoded using a second encoder and using a predictor input based on a first full-resolution predictor LeRepred, the first full-resolution predictor LeRepred based on the first and second intermediate predictors Lpred,Rpred, respectively formed by up-scaling the respective spatial halves of the image information comprised in the base-layer LeRe' to full-resolution respectively and a second enhancement-layer LR-enh2, the second enhancement-layer comprising an encoded third combined image LoRo-nf' being encoded using a third encoder and using a predictor input based on a first full-resolution predictor LoRopred, the first full-resolution predictor LoRopred based on the first and second intermediate predictors Lpred,Rpred, respectively formed by up-scaling the respective spatial halves of the image information comprised in the base-layer LoRo' to full-resolution respectively.

Also included in the third variant of the invention is a method of decoding an image pair (L,R) corresponding with two views of a multi-view signal. Typically this method comprises receiving a broadcasted bit-stream BS, e.g. following a broadcast over a network, wired or wireless, or following retrieval from a storage medium.

Although multiple bitstreams may be received typically the method also comprises de-multiplexing the received bit-stream in order to obtain the base-layer, the first enhancement layer and the second enhancement layer.

Once available the actual decoding may commence. The decoding involves generating a first decoded combined image (LeRe') by decoding a base-layer. Next similar to the encoding process the first decoded combined image is used to generate two intermediate predictors. These two intermediate predictors are obtained by up-scaling the respective spatial halves of the image information comprised in the base-layer LeRe' to respectively form a first intermediate predictor Lpred and a second intermediate predictor Rpred, both at full-resolution.

Next the two intermediate predictors Lpred and Rpred are used to generate tow full resolution predictors for decoding the respective enhancement layers.

To this end the method comprises generating a first full resolution predictor LeRepred for use in decoding a first enhancement layer LR-enh1 based on the first and second intermediate predictors Lpred, Rpred. In case of LeRepred the samples having first parity are selected from the respective intermediate predictors. Next the second full resolution predictor LoRopred is generated for use in decoding a second enhancement layer LR-enh2 based on the first and second intermediate predictors Lpred, Rpred. In case of LeRepred the samples having second parity are selected from the respective intermediate predictors.

Next the first enhancement-layer LR-enh1 is decoded using the first full resolution predictor LeRepred resulting in the decoded second combined image LeRe-nf'. Likewise the second enhancement-layer LR-enh2 is decoded using the second full resolution predictor LoRopred resulting in the decoded third combined image LoRo-nf'.

Based on these two decoded combined images it is possible to reconstructing a first reconstructed image L' using spatially co-located samples in the second decoded combined image LeRe-nf' as samples having a first parity in the first reconstructed image L' and using spatially co-located samples in the third decoded combined image LoRo-nf' as samples having a second parity in the first reconstructed image L', thereby forming the first reconstructed image L'.

Moreover these two decoded combined images enable reconstructing of a second reconstructed image R' using further spatially co-located samples in the second decoded combined image LeRe-nf' as samples having a first parity in the second reconstructed image R' and using further spatially co-located samples in the third decoded combined image LoRo-nf' as samples having a second parity in the second reconstructed image R', thereby forming the second reconstructed image.

Preferably the samples having the first parity in the first reconstructed image L' are formed by a first spatial half of the second decoded combined image LeRe-nf' and the samples having the second parity in the first reconstructed image L' are formed by a first spatial half of the third decoded combined image LoRo-nf'.

Preferably the samples having the first parity in the second reconstructed image R' are formed by a second spatial half of the second decoded combined image LeRe-nf' and the samples having the second parity in the second reconstructed image R' are formed by a second spatial half of the third decoded combined image LoRo-nf'.

Preferably the first, second and third decoded combined images LeRe', LeRe-nf',LoRo-nf are side by side encoded images or top-bottom encoded images.

Further Embodiments of the Third Variant

Further embodiments of the third variant can be described in reference to the following clauses.

In accordance with the third variant of the present invention, an encoder, a decoder, a method of encoding, a method of decoding an image pair corresponding with two views of a multi-view signal is provided as well as a bit-stream representing two views of a multi-view signal, a computer program product and a software tool for executing the methods according to the present invention are provided in the clauses: 301-315, 320, 330-338, 350-351, 360 and 361.

Clause 301. A method of encoding an image pair (L,R) corresponding with two views of a multi-view signal the method comprising:
- generating a first combined image (LeRe) based on a first low pass filtered version of a first image of the image pair and a first low-pass filtered version of the second image of the image pair, the first combined image (LeRe) comprising:
  - samples having a first parity from the first low-pass filtered version of the first image, the samples being spatially co-located in the first combined image and
  - samples having a first parity from the first low-pass filtered version of the second image, the samples being spatially co-located in the first combined image,
- generating a second combined image (LeRe-nf), the second combined image (LeRe-nf) comprising:
  - samples having first parity of the first image, the samples being spatially co-located in the second combined image and
  - samples having first parity from the second image the samples being spatially co-located in the second combined image,
- generating a third combined image (LoRo-nf), the third combined image (LoRo-nf) comprising:
  - samples having second parity of the first image, the samples being spatially co-located in the third combined image and
  - samples having second parity from the second image the samples being spatially co-located in the third combined image,
- generating a base-layer (LR-bas) by encoding the first combined image (LeRe),
- up-scaling the respective spatial halves of the image information comprised in the base-layer (LeRe') to respectively form a first intermediate predictor (Lpred) and a second intermediate predictor (Rpred), both at full-resolution,
- generating a first full resolution predictor (LeRepred) for use in generating a first enhancement layer (LR-enh1) based on the first and second intermediate predictors (Lpred, Rpred) and generating the first enhancement-layer (LR-enh1) by encoding the second combined image (LeRe-nf) using the first full resolution predictor (LeRepred),
- generating a second full resolution predictor (LoRopred) for use in generating a second enhancement layer (LR-enh2) based on the first and second intermediate predictors (Lpred, Rpred) and generating the second enhancement-layer (LR-enh2) by encoding the third combined image (LoRo-nf) using the second full resolution predictor (LoRopred).

Clause 302. The method of clause 301, wherein
- the first full resolution predictor comprises:
  - samples having first parity of the first intermediate predictor (Lpred), the samples being spatially co-located in the first full resolution predictor (LeRepred), and
  - samples having first parity of the second intermediate predictor (Rpred), the samples being spatially co-located in the first full resolution predictor (LeRepred) and
- the second full resolution predictor (LoRopred) comprises
  - samples having second parity of the first intermediate predictor (Lpred), the samples being spatially co-located in the second full resolution predictor (LoRopred), and
  - samples having second parity of the second intermediate predictor (Rpred), the samples being spatially co-located in the second full resolution predictor (LoRopred).

Clause 303. The method of any one of the clauses 301-302, wherein the base-layer is encoded using one of:
- an MPEG-2 encoding
- an AVC encoding and
- an HVC encoding.

Clause 304. The method of any one of the clauses 301-303, wherein the respective enhancement-layers are respectively encoded using one of:
- an AVC encoding and
- an HVC encoding.

Clause 305. The method of any one of the clauses 301-304, wherein the multi-view signal is a stereo signal.

Clause 306. The method according to clause 305, wherein the combined images are encoded as one of:
- side-by-side encoded images or
- top-bottom encoded images.

Clause 307. The method of any one of the clauses 301-306, wherein the spatially co-located samples having the first parity correspond with a first half of the combined images and wherein the spatially co-located samples having the second parity correspond with a second half of the combined images.

Clause 308. The method of any one of the clauses 301-307, wherein the multi-view signal is a video sequence.

Clause 309. The method of any one of the clauses 301-308, wherein the first low pass filtered version of the first image and the second low pass filtered version of the first image are one and the same image.

Clause 310. The method of any one of the clauses 301-309, wherein the first low pass filtered version of the second image and the second low pass filtered version of the second image are one and the same image.

Clause 311. The method of any one of the clauses 301-310, where low-pass filtering of the first and/or the second image comprises filtering using one or more filters combined, the one or more filters combined having a cut-off frequency of ½ fs or below ½ fs.

Clause 312. The method of any one of the clauses 301-311, further comprising a step of multiplexing the base-layer, the first enhancement-layer and the second enhancement-layer into a bit-stream (BS).

Clause 313. The method of any one of the clauses 301-312, further comprising a step of broadcasting the bit-stream (BS).

Clause 314. The method of anyone of the clauses 301-313, wherein the up-scaling comprises upsampling followed by a low-pass filter.

Clause 315. The method of clause 314, wherein the low-pass filter for the up-scaling has a cut-off frequency above fs.

Clause 320. A bit-stream (BS) comprising an encoded image pair corresponding with two views of a multi-view signal:
- a base-layer (LR-bas), the base-layer comprising an encoded first combined image (LeRe') being encoded using a first encoder,
- a first enhancement-layer (LR-enh1), the first enhancement-layer comprising an encoded second combined image (LeRe-nf') being encoded using a second encoder and using a predictor input based on a first full-resolution predictor (LeRepred), the first full-resolution predictor (LeRepred) based on the first and second intermediate predictors (Lpred, Rpred), respectively formed by up-scaling the respective spatial halves of the image information comprised in the base-layer (LeRe') to full-resolution respectively,
- a second enhancement-layer (LR-enh2), the second enhancement-layer comprising an encoded third combined image (LoRo-nf') being encoded using a third encoder and using a predictor input based on a first full-resolution predictor (LoRopred), the first full-resolution predictor (LoRopred) based on the first and second intermediate predictors (Lpred, Rpred), respectively formed by up-scaling the respective spatial halves of the image information comprised in the base-layer (LoRo') to full-resolution respectively.

Clause 330. A method of decoding an image pair (L,R) corresponding with two views of a multi-view signal the method comprising:

generating a first decoded combined image (LeRe') by decoding a base-layer, up-scaling the respective spatial halves of the image information comprised in the base-layer (LeRe') to respectively form a first intermediate predictor (Lpred) and a second intermediate predictor (Rpred), both at full-resolution, generating a first full resolution predictor (LeRepred) for use in decoding a first enhancement layer (LR-enh1) based on the first and second intermediate predictors (Lpred, Rpred) and decoding the first enhancement-layer (LR-enh1) using the first full resolution predictor (LeRepred) resulting in the decoded second combined image (LeRe-nf'), generating a second full resolution predictor (LoRopred) for use in decoding a second enhancement layer (LR-enh2) based on the first and second intermediate predictors (Lpred, Rpred) and decoding the second enhancement-layer (LR-enh2) using the second full resolution predictor (LoRopred) resulting in the decoded third combined image (LoRo-nf'), reconstructing a first reconstructed image (L')

using spatially co-located samples in the second decoded combined image (LeRe-nf') as samples having a first parity in the first reconstructed image (L') and using spatially co-located samples in the third decoded combined image (LoRo-nf') as samples having a second parity in the first reconstructed image (L'), thereby forming the first reconstructed image (L'), and reconstructing a second reconstructed image (R')

using further spatially co-located samples in the second decoded combined image (LeRe-nf') as samples having a first parity in the second reconstructed image (R') and using further spatially co-located samples in the third decoded combined image (LoRo-nf') as samples having a second parity in the second reconstructed image (R'), thereby forming the second reconstructed image.

Clause 331. The method according to clause 330, wherein:

the samples having the first parity in the first reconstructed image (L') are formed by a first spatial half of the second decoded combined image (LeRe-nf') and the samples having the second parity in the first reconstructed image (L') are formed by a first spatial half of the third decoded combined image (LoRo-nf').

Clause 332. The method according to clause 331, wherein:

the samples having the first parity in the second reconstructed image (R') are formed by a second spatial half of the second decoded combined image (LeRe-nf') and the samples having the second parity in the second reconstructed image (R') are formed by a second spatial half of the third decoded combined image (LoRo-nf').

Clause 333. The method according to any one of clauses 330-332, wherein the multi-view signal is a stereo signal.

Clause 334. The method according to clause 333, wherein:

the first, second and third decoded combined images (LeRe', LeRe-nf',LoRo-nf) are side by side encoded images or the first, second and third decoded combined images (LeRe', LeRe-nf',LoRo-nf) are top-bottom encoded images.

Clause 335. The method of any one of the clauses 330-334, further comprising receiving a broadcasted bit-stream (BS).

Clause 336. The method of any one of the clauses 330-335, further comprising de-multiplexing a received bit-stream in order to obtain the base-layer, the first enhancement layer and the second enhancement layer.

Clause 337. The method of anyone of the clauses 330-336, wherein the up-scaling comprises upsampling followed by a low-pass filter.

Clause 338. The method of clause 237, wherein the low-pass filter for the up-scaling has a cut-off frequency above fs.

Clause 350. An encoder for encoding an image pair (L,R) corresponding with two views of a multi-view signal the method comprising:

a first generator for generating a first combined image (LeRe) based on a first low pass filtered version of a first image of the image pair and a first low-pass filtered version of the second image of the image pair, the first combined image (LeRe) comprising:

samples having a first parity from the first low-pass filtered version of the first image, the samples being spatially co-located in the first combined image and samples having a first parity from the first low-pass filtered version of the second image, the samples being spatially co-located in the first combined image, a second generator for generating a second combined image (LeRe-nf), the second combined image (LeRe-nf) comprising:

samples having first parity of the first image, the samples being spatially co-located in the second combined image and samples having first parity from the second image the samples being spatially co-located in the second combined image, a third generator for generating a third combined image (LoRo-nf), the third combined image (LoRo-nf) comprising:

samples having second parity of the first image, the samples being spatially co-located in the third combined image and samples having second parity from the second image the samples being spatially co-located in the third combined image, a first encoder for generating a base-layer (LR-bas) by encoding the first combined image (LeRe), a first upscaler for up-scaling the respective spatial halves of the image information comprised in the base-layer (LeRe') to respectively form a first intermediate predictor (Lpred) and a second intermediate predictor (Rpred), both at full-resolution, a fourth generator for generating a first full resolution predictor (LeRepred) for use in generating a first enhancement layer (LR-enh1) based on the first and second intermediate predictors (Lpred, Rpred) and a second encoder for generating the first enhancement-layer (LR-enh1) by encoding the second combined image (LeRe-nf) using the first full resolution predictor (LeRepred), a fifth generator for generating a second full resolution predictor (LoRopred) for use in generating a second enhancement layer (LR-enh2) based on the first and second intermediate predictors (Lpred, Rpred) and a third encoder for generating the second enhancement-layer (LR-enh2) by encoding the third combined image (LoRo-nf) using the second full resolution predictor (LoRopred).

Clause 351. A decoder for decoding an image pair (L,R) corresponding with two views of a multi-view signal the method comprising:

a first decoder for generating a first decoded combined image (LeRe') by decoding a base-layer, an upscaler for up-scaling the respective spatial halves of the image information comprised in the base-layer (LeRe') to respectively form a first intermediate predictor (Lpred) and a second intermediate predictor (Rpred), both at full-resolution, a first generator for generating a first full resolution predictor (LeRepred) for use in decoding a first enhancement layer (LR-enh1) based on the first and second intermediate predictors (Lpred, Rpred) and a second decoder for decoding the first enhancement-layer (LR-enh1) using the first full resolution predictor (LeRepred) resulting in the decoded second combined image (LeRe-nf'), a second generator for generating a second full resolution predictor (LoRopred) for use in decoding a second enhancement layer (LR-enh2) based on the first and second intermediate predictors (Lpred, Rpred) and a third decoder for decoding the second enhancement-layer (LR-enh2) using the second full resolution predictor (LoRopred) resulting in the decoded third combined image (LoRo-nf'), a first reconstructor for reconstructing a first reconstructed image (L')

using spatially co-located samples in the second decoded combined image (LeRe-nf') as samples having a first parity in the first reconstructed image (L') and using spatially co-located samples in the third decoded combined image (LoRo-nf') as samples having a second parity in the first reconstructed image (L'), thereby forming the first reconstructed image (L'), and a second reconstructor for reconstructing a second reconstructed image (R')

using further spatially co-located samples in the second decoded combined image (LeRe-nf') as samples having a first parity in the second reconstructed image (R') and using further spatially co-located samples in the third decoded combined image (LoRo-nf') as samples having a second parity in the second reconstructed image (R'), thereby forming the second reconstructed image.

Clause 360. A computer program product on a computer readable medium, the product comprising instructions for executing at least one of the methods of clauses 301-315 or 330-338.

Clause 361. A software tool for executing at least one or more methods of clauses 301-315 or 330-338, wherein the software tool comprises instructions for executing the at least one or more methods.

Generalization

With regard to the various variants and aspects of the present invention it is noted that the additional features and additional information which needs to be encoded is preferably hidden from view of legacy devices. A simple approach which enables hiding information from legacy devices is disclosed in International Patent Application WO 2009/040701 titled "METHOD AND SYSTEM FOR ENCODING A VIDEO DATA SIGNAL, ENCODED VIDEO DATA SIGNAL, METHOD AND SYSTEM FOR DECODING A VIDEO DATA SIGNAL", by the same applicant, hereby incorporated by reference.

It will be appreciated that the above description for clarity has described embodiments of the invention with reference to a single decoding/encoding processor. However, it will be apparent that any suitable distribution of functionality between different functional units or processors may be used without detracting from the invention. Hence, references to the decoding/encoding processor are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements or method steps may be implemented by e.g. a single unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of encoding an image pair (L,R) corresponding with two views of a multi-view signal, the method comprising:

generating a first combined image (LeRo) based on a first low pass filtered version of a first image of the image pair and a first low-pass filtered version of the second image of the image pair, the first combined image (LeRo) comprising:

samples having a first parity from the first low-pass filtered version of the first image, the samples being spatially co-located in the first combined image, whereby the samples are aligned together in either a side-by-side or a top-to-bottom arrangement and samples having a second parity from the first low-pass filtered version of the second image, the samples being spatially co-located in the first combined image, whereby the samples are aligned together in either a side-by-side or a top-to-bottom arrangement, generating a base-layer (LR-bas) by encoding the first combined image (LeRo), generating first and second disparity based predictors (LpredD,RpredD) and respectively associated first and second block-based displacement vectors (LHvec,RHvec) associated with the image information (LeRo') encoded in the base layer (LR-bas), the first and second block-based displacement vectors (LHvec,RHvec)

being generated using disparity information present in the first and second images (L,R), the image information (LeRo') encoded in the base layer (LR-bas) and the respective first and second images (L,R), generating an enhancement-layer (LR-enh; L-enh,R-enh) by encoding the first and second images (L,R) using the first and second disparity based predictors (LpredD, RpredD).

2. The method of claim 1, wherein generating the first and second disparity based predictors (LpredD,RpredD) comprises generating:

the first disparity predictor (LpredD) and the first block-based displacement vectors (LHvec) based on
the image information (LeRo') encoded in the base layer (LR-bas) (LcRo'),
the first image (L) and
disparity information derived from the first and second images and the second disparity predictor (RpredD) and the second block-based displacement vectors (RHvec) based on
the image information (LeRo') encoded in the base layer (LR-bas),
the second image (R) and
disparity information derived from the first and second images.

3. The method of claim 1, wherein the first and second images (L,R) are encoded in the enhancement layer (LR-enh) in the form of a second combined image (LoRe), and the method further comprises:

generating the second combined image (LoRe) based on a second low pass filtered version of the first image of the image pair and a second low-pass filtered version of the second image of the image pair, the second combined image (LoRe) comprising:
samples having second parity from the second low-pass filtered version of the first image the samples being spatially co-located in the second combined image and
samples having first parity from the second low-pass filtered version of the second image the samples being spatially co-located in the second combined image.

4. The method of claim 3, wherein generating the block-based displacement vectors comprises:
generating an initial disparity estimation (Ldis, Rdis) using the first and second images (L,R) and
generating block-based displacement vectors (LHvec, RHvec) associated with the respective the disparity predictors (LpredD, RpredD) using the initial disparity estimation (Ldis,Rdis).

5. The method of claim 3, further comprising:
combining the first disparity predictor (LpredD) and the second disparity based predictor (RpredD) into a disparity based predictor (LoRepredD), the disparity based predictor (LoRepredD) comprising:
samples having second parity from the first disparity predictor of the first image, the samples being spatially co-located in the disparity based predictor (LoRepredD) and
samples having first parity from the second disparity predictor of the second image, the samples being spatially co-located in the disparity based predictor (LoRepredD),
and wherein said encoding the first and second images (L,R) comprises using the first and second disparity based predictors (LpredD, RpredD) in the form of the disparity based predictor (LoRepredD).

6. The method of claim 1, wherein the enhancement-layer (L-enh,R-enh) is formed by a first enhancement-layer (L-enh) and a second enhancement-layer (R-enh), and the method further comprises:
generating the first enhancement-layer (L-enh) by encoding the first image (L) using the first disparity based predictor (LpredD),
generating the second enhancement layer (R-enh) by encoding the second image (R) using the second disparity based predictor (RpredD).

7. The method of claim 6, further comprising:
up-scaling the respective spatial halves of the image information comprised in the base-layer (LR-bas) to respectively form a first intermediate predictor (Lpred) and a second intermediate predictor (Rpred), both at full-resolution,
encoding the first image (L) further using the first intermediate predictor (Lpred), and
encoding the second image (R) further using the first intermediate predictor (Rpred).

8. The method of claim 1, wherein the base-layer is encoded using one of:
an MPEG-2 encoding
an AVC encoding and
an HVC encoding
or wherein the enhancement-layer is encoded using one of:
an AVC encoding and
an HVC encoding.

9. The method of claim 1, wherein the combined images are encoded as one of:
side-by-side encoded images or
top-bottom encoded images.

10. The method of claim 1, further comprising a step of multiplexing the base-layer (LR-bas), the enhancement-layer (LR-enh; L-enh,R-enh), the first block-based displacement vectors (LHvec) and the second block-based displacement vectors (RHvec) into a bit-stream (BS).

11. The method of claim 1, further comprising a step of broadcasting the bit-stream (BS).

12. A method of decoding an image pair (L,R) corresponding with two views of a multi-view signal, the method comprising:
generating a first decoded combined image (LeRo') by decoding a base-layer (LR-bas),
generating first and second disparity based predictors (LpredD,RpredD) using respectively associated first and second block-based displacement vectors (LHvec, RHvec) in combination with the first decoded combined image (LeRo'), the first and second block-based displacement vectors (LHvec,RHvec) being associated with the first decoded combined image (LeRo'), the first and second block-based displacement vectors (LHvec, RHvec) being generated using disparity information present in the first and second images (L,R), the first decoded combined image (LeRo') and the respective first and second images (L,R),
decoding an enhancement-layer (LR-enh; L-enh,R-enh) using the first and second disparity based predictors (LpredD,RpredD) forming a first reconstructed image (L') and a second reconstructed image (R').

13. The method of claim 12, wherein the first and second images (L,R) are encoded in the enhancement layer (LR-enh) in the form of a second combined image (LoRe), and the method further comprises:

generating the second decoded combined image (LoRe') by decoding the enhancement-layer (LR-enh) using the first and second disparity based predictors (LpredD, RpredD), reconstructing the first reconstructed image (L')
using spatially co-located samples in the first decoded combined image (LeRo') as samples having a first parity in the first reconstructed image (L') and
using spatially co-located samples in the second decoded combined image (LoRe') as samples having a second parity in the first reconstructed image (L'), thereby forming the first reconstructed image (L'), and reconstructing the second reconstructed image (R')
using further spatially co-located samples in the first decoded combined image (LeRo') as samples having a second parity in the second reconstructed image (R') and
using further spatially co-located samples in the second decoded combined image (LoRe') as samples having a first parity in the second reconstructed image (R'), thereby forming the second reconstructed image.

14. The method of claim 12, wherein the enhancement-layer (L-enh,R-enh) is formed by a first enhancement-layer (L-enh) and a second enhancement-layer (R-enh), and the method further comprises:
decoding the first enhancement-layer (L-enh) using the first disparity based predictor (LpredD) forming the first reconstructed picture (L'),
decoding the second enhancement layer (R-enh) using the second disparity based predictor (RpredD) forming a second reconstructed picture (R').

15. An encoder for encoding an image pair (L,R) corresponding with two views of a multi-view signal, the encoder comprising:
a first generator for generating a first combined image (LeRo) based on a first low pass filtered version of a first image of the image pair and a first low-pass filtered version of the second image of the image pair, the first combined image (LeRo) comprising:
samples having a first parity from the first low-pass filtered version of the first image, the samples being spatially co-located in the first combined image, whereby the samples are aligned together in either a side-by-side or a top-to-bottom arrangement and
samples having a second parity from the first low-pass filtered version of the second image, the samples being spatially co-located in the first combined image, whereby the samples are aligned together in either a side-by-side or a top-to-bottom arrangement,
a first encoder (Enc1) for generating a base-layer (LR-bas) by encoding the first combined image (LeRo),
a second generator for generating first and second disparity based predictors (LpredD,RpredD) and respectively associated first and second block-based displacement vectors (LHvec,RHvec) associated with the image information (LeRo') encoded in the base layer (LR-bas), the first and second block-based displacement vectors (LHvec,RHvec) being generated using disparity information present in the first and second images (L,R), the image information (LeRo') encoded in the base layer (LR-bas) and the respective first and second images (L,R),
an enhancement encoder (Enc2; Enc2,Enc3) for generating an enhancement-layer (LR-enh; L-enh,R-enh) by encoding the first and second images (L,R) using the first and second disparity based predictors (LpredD, RpredD).

16. The encoder of claim 15, wherein the first and second images (L,R) are encoded in the enhancement layer (LR-enh) in the form of a second combined image (LoRe), and wherein the encoder further comprises:
a third generator for generating the second combined image (LoRe) based on a second low pass filtered version of the first image of the image pair and a second low-pass filtered version of the second image of the image pair, the second combined image (LoRe) comprising:
samples having second parity from the second low-pass filtered version of the first image the samples being spatially co-located in the second combined image and
samples having first parity from the second low-pass filtered version of the second image the samples being spatially co-located in the second combined image.

17. The encoder of claim 15, wherein the enhancement-layer is formed by a first enhancement-layer (L-enh) and a second enhancement-layer (R-enh), and wherein the enhancement encoder comprises:
a second encoder for generating the first enhancement-layer (L-enh) by encoding the first image (L) using the first disparity based predictor (LpredD),
a third encoder for generating the second enhancement layer (R-enh) by encoding the second image (R) using the first disparity based predictor (RpredD).

18. A decoder for decoding an image pair (L,R) corresponding with two views of a multi-view signal, the decoder comprising:
a first decoder for generating a first decoded combined image (LeRo') by decoding a base-layer,
a first generator for generating first and second disparity based predictors (LpredD,RpredD) using respectively associated first and second block-based displacement vectors (LHvec,RHvec) in combination with the first decoded combined image (LeRo'), the first and second block-based displacement vectors (LHvec,RHvec) being associated with the first decoded combined image (LeRo'), the first and second block-based displacement vectors (LHvec,RHvec) being generated using disparity information present in the first and second images (L,R), the first decoded combined image (LeRo') and the respective first and second images (L,R),
an enhancement decoder for decoding an enhancement-layer (LR-enh; L-enh,R-enh) using the first and second disparity based predictors (LpredD,RpredD) forming a first reconstructed image (L') and a second reconstructed image (R').

19. The decoder of claim 18, wherein the first and second images (L,R) are encoded in the enhancement layer (LR-enh) in the form of a second combined image (LoRe), and the decoder further comprises:
the enhancement decoder comprising a second decoder for generating the second decoded combined image (LoRe') by decoding the enhancement-layer (LR-enh) using the first and second disparity based predictors (LpredD, RpredD),
a first reconstructor for reconstructing the first reconstructed image (L')
using spatially co-located samples in the first decoded combined image (LeRo') as samples having a first parity in the first reconstructed image (L') and
using spatially co-located samples in the second decoded combined image (LoRe') as samples having a second parity in the first reconstructed image (L'), thereby forming the first reconstructed image (L'), and a second reconstructor for reconstructing the second reconstructed image (R')
using further spatially co-located samples in the first decoded combined image (LeRo') as samples having a second parity in the second reconstructed image (R') and
using further spatially co-located samples in the second decoded combined image (LoRe') as samples having a first parity in the second reconstructed image (R'), thereby forming the second reconstructed image.

20. The decoder of claim 18, wherein the enhancement-layer (L-enh,R-enh) is formed by a first enhancement-layer (L-enh) and a second enhancement-layer (R-enh), and the enhancement decoder comprises:
a second decoder for decoding the first enhancement-layer (L-enh) using the first disparity based predictor (LpredD) forming the first reconstructed picture (L'),
a third decoder for decoding the second enhancement layer (R-enh) using the second disparity based predictor (RpredD) forming a second reconstructed picture (R').

21. A computer program product stored on a non-transitory computer readable medium, the product comprising instructions for executing at a method of encoding an image pair (L,R) corresponding with two views of a multi-view signal, the method comprising:
generating a first combined image (LeRo) based on a first low pass filtered version of a first image of the image pair and a first low-pass filtered version of the second image of the image pair, the first combined image (LeRo) comprising:
samples having a first parity from the first low-pass filtered version of the first image, the samples being spatially co-located in the first combined image, whereby the samples are aligned together in either a side-by-side or a top-to-bottom arrangement and
samples having a second parity from the first low-pass filtered version of the second image, the samples being spatially co-located in the first combined image, whereby the samples are aligned together in either a side-by-side or a top-to-bottom arrangement,
generating a base-layer (LR-bas) by encoding the first combined image (LeRo),
generating first and second disparity based predictors (LpredD,RpredD) and respectively associated first and second block-based displacement vectors (LHvec,RHvec) associated with the image information (LeRo') encoded in the base layer (LR-bas), the first and second block-based displacement vectors (LHvec,RHvec) being generated using disparity information present in the first and second images (L,R), the image information (LeRo') encoded in the base layer (LR-bas) and the respective first and second images (L,R),
generating an enhancement-layer (LR-enh; L-enh,R-enh) by encoding the first and second images (L,R) using the first and second disparity based predictors (LpredD, RpredD).

* * * * *